United States Patent [19]
Cooper et al.

[11] Patent Number: 6,108,409
[45] Date of Patent: Aug. 22, 2000

[54] COMMUNICATION SYSTEM WITH CENTRALIZED GLOBAL TITLE TRANSLATION TABLE

[75] Inventors: Roy K. Cooper, Richardson; William L. Scott; Jeffrey C. Clark, both of Plano, all of Tex.

[73] Assignee: Alcatel USA Sourcing, L.P., Plano, Tex.

[21] Appl. No.: 09/073,447

[22] Filed: May 5, 1998

Related U.S. Application Data

[60] Provisional application No. 60/046,102, May 9, 1997.
[51] Int. Cl.$^7$ .............................. H04M 7/00; H04M 3/42; H04M 3/00; G06F 7/00
[52] U.S. Cl. ..................... 379/230; 379/207; 379/279; 707/8; 707/10; 707/200
[58] Field of Search .................................. 379/201, 207, 379/219, 220, 229, 230, 240, 279; 707/8, 10, 200

[56] References Cited

U.S. PATENT DOCUMENTS

| | | | |
|---|---|---|---|
| 5,481,603 | 1/1996 | Gutierrez et al. | 379/220 X |
| 5,579,318 | 11/1996 | Reuss et al. | 370/410 |
| 5,583,976 | 12/1996 | Bullard, Jr. | 345/440 |

*Primary Examiner*—Harry S. Hong
*Attorney, Agent, or Firm*—Anderson, Levine & Lintel, LLP

[57] ABSTRACT

AIN services include multiple SCP pairs, which can be expanded to meet increased demand. The expansion can occur without cessation in services by migrating records between SCP pairs while maintaining redundancy between the pairs. A centralized GTT maintains the GTTs distributed between multiple subsystems in the AIN system. Synchronization between mate SCPs within a pair occurs at high speed as the subscriber database is split into multiple files, each file having a separate synchronization process.

24 Claims, 14 Drawing Sheets

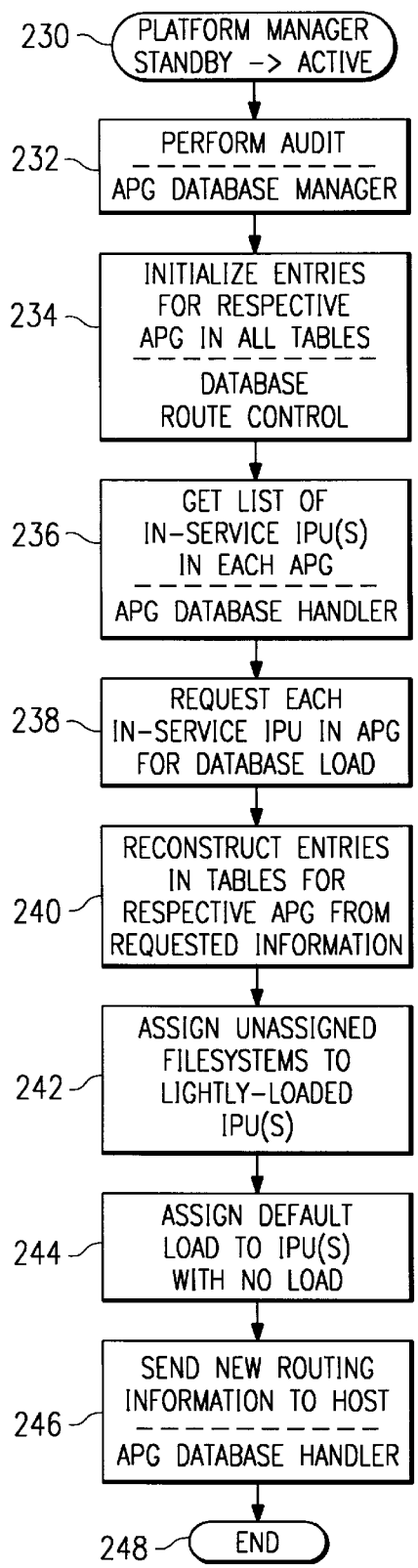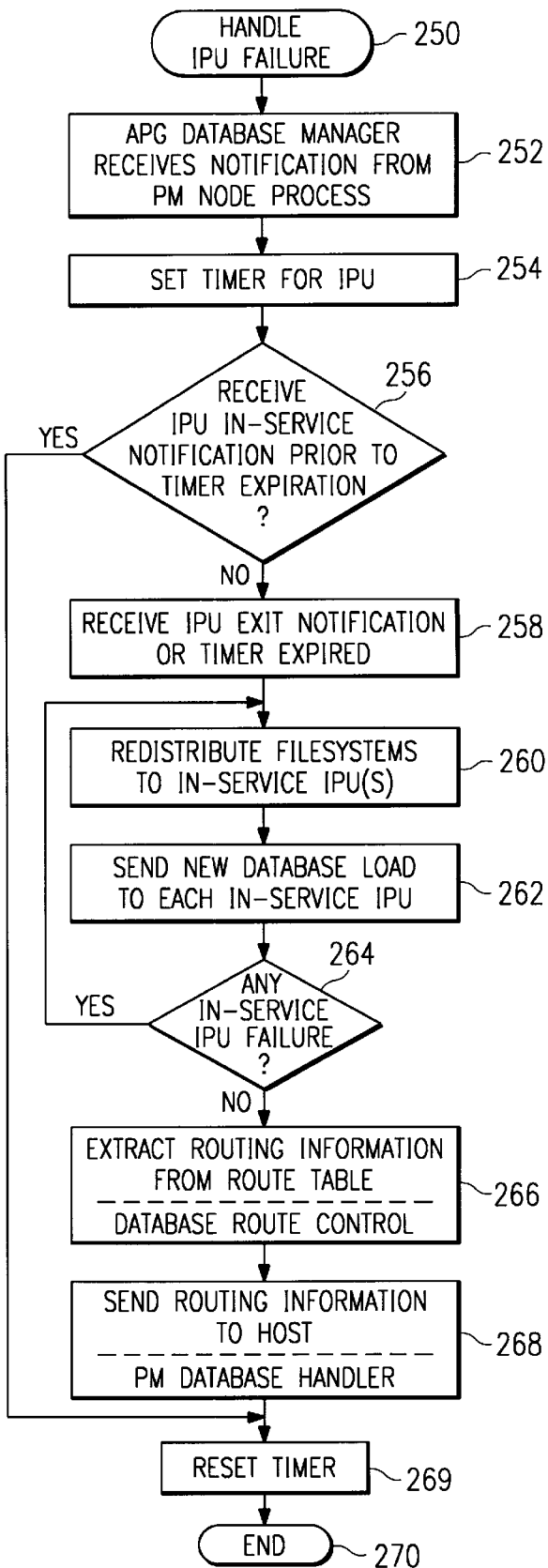

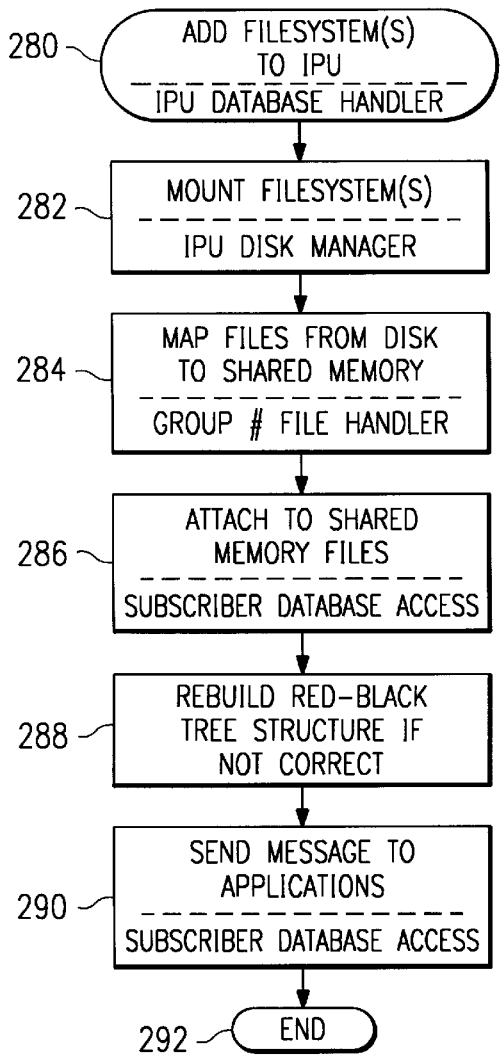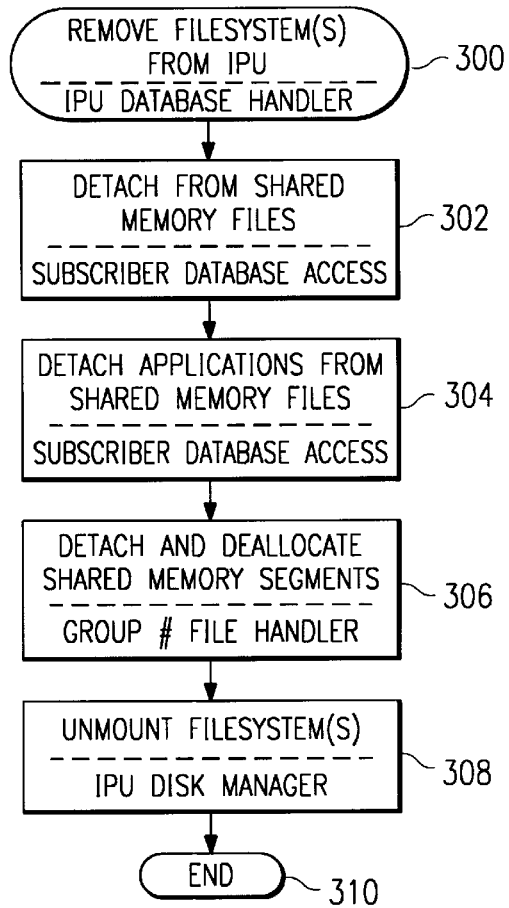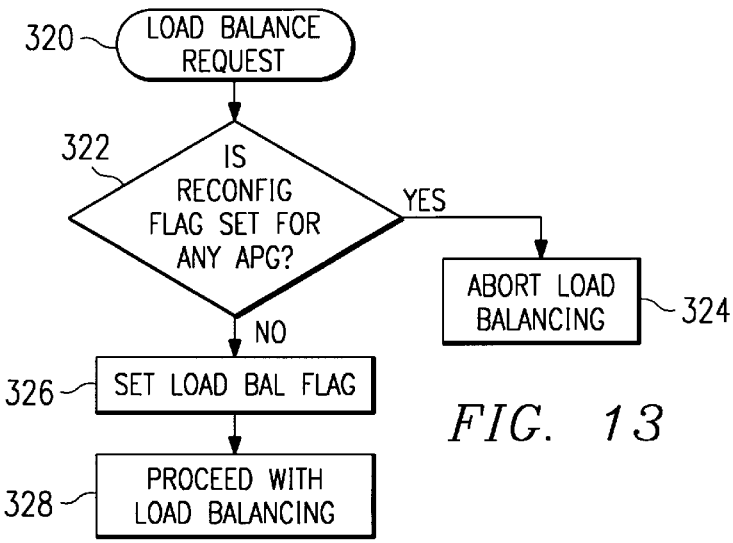

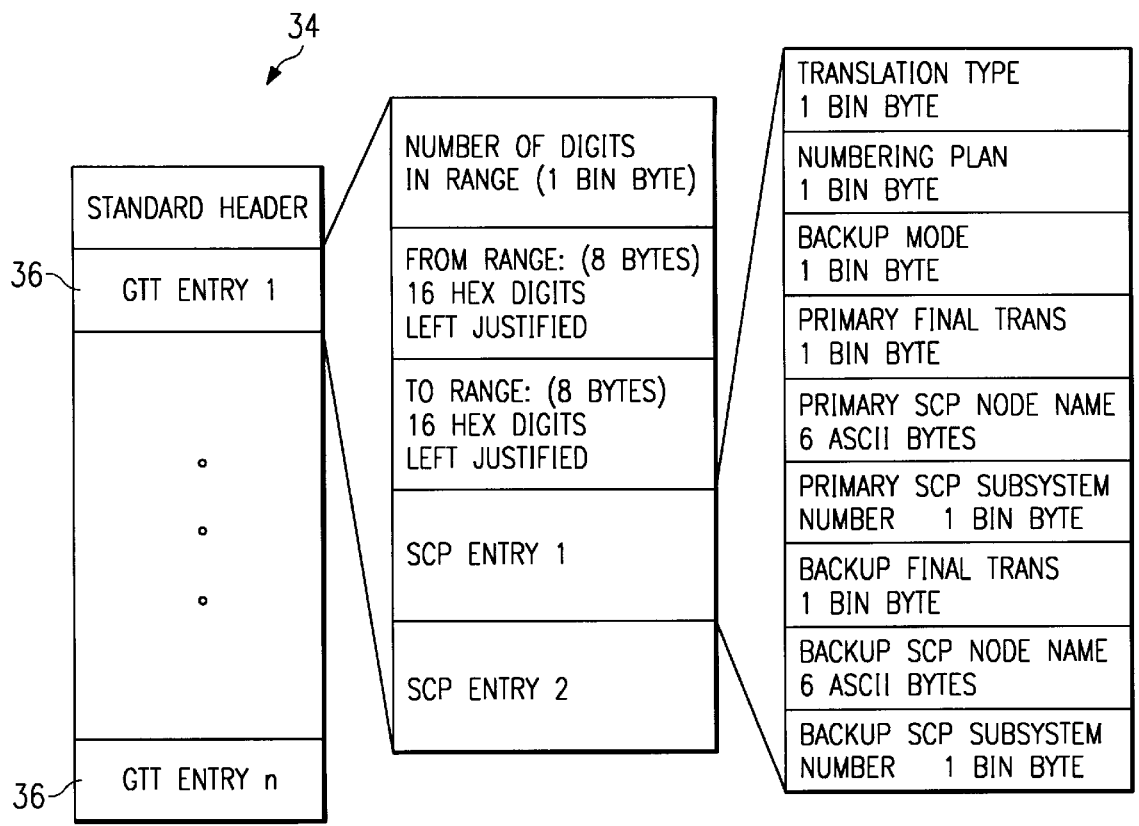
FIG. 20
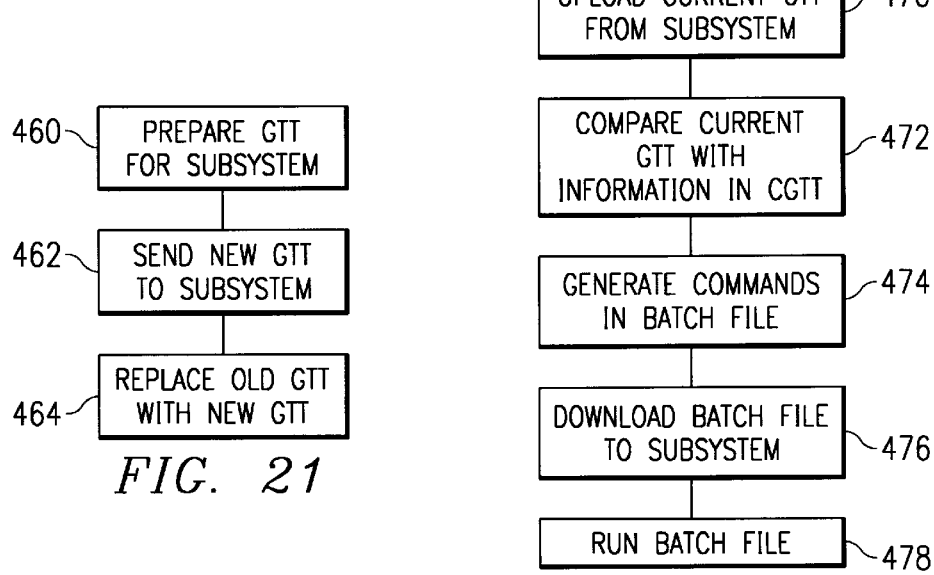
FIG. 21
FIG. 22

COMMUNICATION SYSTEM WITH CENTRALIZED GLOBAL TITLE TRANSLATION TABLE

CROSS-REFERENCE TO RELATED APPLICATIONS

This application claims the benefit of the filing date of copending provisional application U.S. Ser. No. 60/046,102, filed May 9, 1997, entitled "Communication system with Centralized Global title Translation Table" to Cooper et al.

This patent application is related to U.S. pat. app. Ser. No. 08/640,544 entitled "Distributed Redundant Database" to Rekieta et al, filed May 2, 1996, now U.S. Pat. No. 5,890,156 and U.S. pat. app. Ser. No. 08/526,953 titled "System and Method for Multi-Site Distributed Object Management Environment" to Woster et al, filed Sep. 12, 1995, now U.S. Pat. No. 5,892,946.

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to a method and apparatus for providing an expandable redundant database.

2. Description of the Related Art

Wireless telecommunications has been rapidly growing over the last several years. One of the most popular forms of wireless telecommunications is cellular telephony; however, other technologies, such as PHS (Personal Handyphone System) which is popular in Japan and is expected to have a significant impact in other parts of the world in the coming years.

PHS differs from cellular technology in that the mobile devices, such a telephones and modems, communicate through "base stations" which currently have a cell range (radius) of about 100–500 meters as opposed to a cell range of about 1500–5000 meters for a cellular cell. Accordingly, the distribution of base stations is much more dense than for cellular cells. However, the output of the PHS handsets can be significantly lower than cellular counterparts—a PHS handset has an output of about 10 milliwatts, while a cellular phone typically has an output of 0.6–1.0 watts. PHS is expected to offer superior features at a lower price in the near future.

In PHS systems, and other wireless telecommunications systems, one or more subscriber databases store information about each subscriber's account, such as service options (e.g. voice mail), restrictions (e.g. call blocking, long distance restrictions), billing information and status and current location (i.e., which base station is currently in contact with the subscriber's phone). The information in this database is necessary for all phone transactions, so the database is typically kept in fully redundant computers, such that a failure in one computer will not prevent access to the data. In order to guard against catastrophic failures, such as failures caused by flooding, earthquakes or other natural disasters, the redundant computers are often physically separated, often by hundreds of miles.

As the number of subscribers increase, the database size increases accordingly. Eventually, the database will be too large for a single computer to efficiently maintain.

Therefore, a need has arisen for a method and apparatus for providing an expandable subscriber database.

BRIEF SUMMARY OF THE INVENTION

In the present invention, a communications system includes a plurality of telephonic devices coupled to a switching network, using a service network for providing information responsive to requests for subscriber information from said switching network. The service network includes database circuitry for maintaining a database of subscriber information, wherein the database circuitry comprising a plurality of service control points, each service control points responsible for maintaining a portion of the database. A centralized title translation table defines a relationship between subscriber numbers and the service control point associated with said subscriber number. Tables are generated responsive to the centralized title translation table for use in various subsystems of said service network.

The present invention provides significant advantages over the prior art. Using a centralized title translation table, subsystems throughout the AIN can be updated to changes or additions in the allocations of subscriber number ranges to the plurality of service control points in the AIN. This provides flexibility in configuring the multiple service control points without complicated procedures for effecting changes.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 9 is an exemplary flowchart of a process in which a PM transitions from standby to active operating status;

FIG. 10 is an exemplary flowchart of a process for handling IPU failures;

FIG. 11 is an exemplary flowchart of a process for adding filesystem(s) to an IPU;

FIG. 12 is an exemplary flowchart of a process for removing filesystem(s) from an IPU;

FIG. 13 is an exemplary flowchart of a load balance request process;

FIG. 20 illustrates the format of a Centralized Global Title Translation (CGTT) table;

FIGS. 21 and 22 illustrate flow charts for modifying global title translation tables from the CGTT.

DETAILED DESCRIPTION OF THE INVENTION

The present invention is best understood in relation to FIGS. 1–23 of the drawings, like numerals being used for like elements of the various drawings.

Figure 1A:
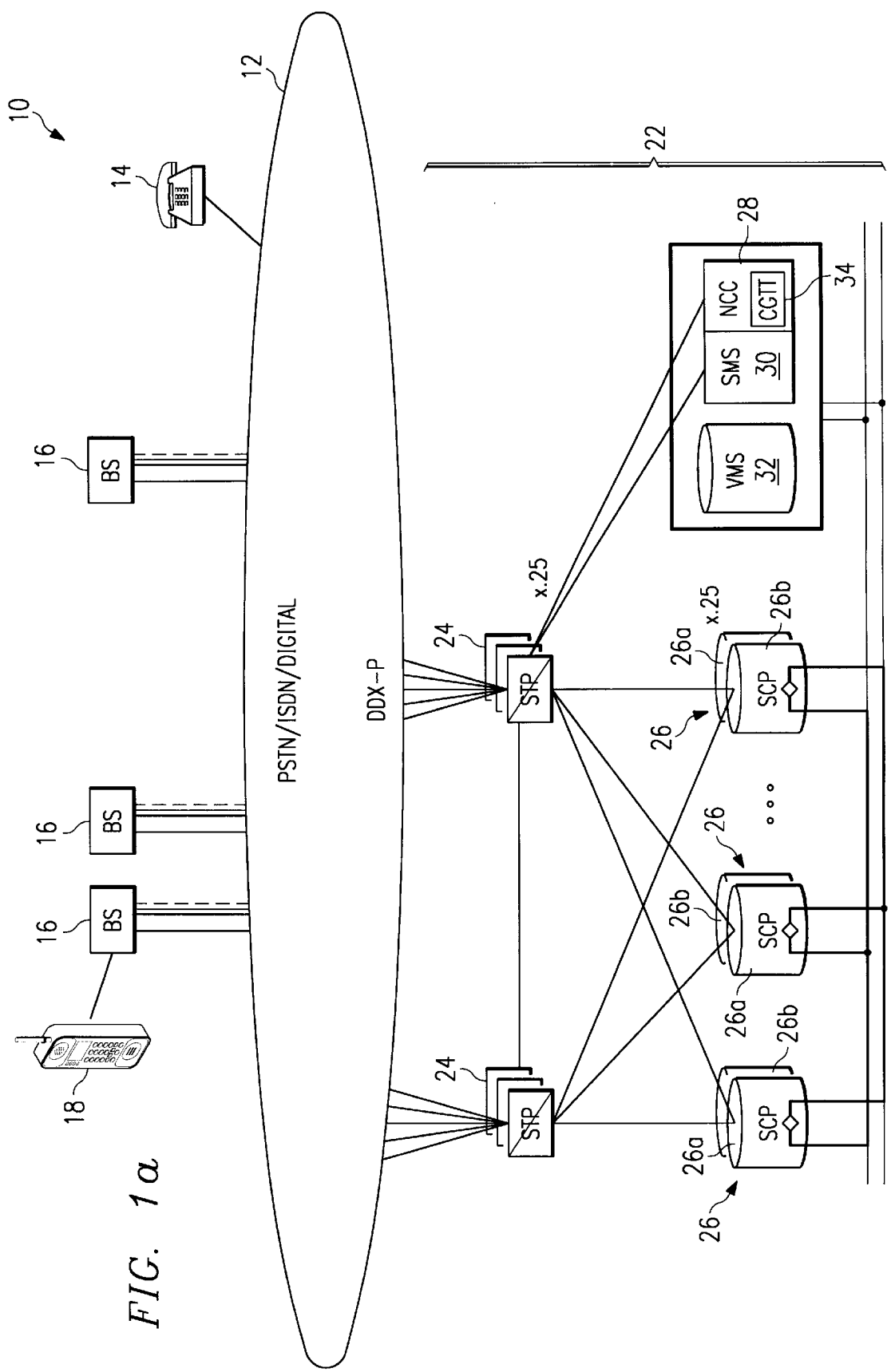
FIG. 1a illustrates a block diagram of a telephone system having a AIN services in which SCPs (service control points) which can be added dynamically to increase capacity.

FIG. 1*a* illustrates a block diagram of a telephone system 10 with PHS capabilities. The PSTN (public switched telephone network) 12 is coupled to a plurality of devices 14, such as telephones, PBXs (private branch exchanges), modems, and digital devices. Additionally, a plurality of PHS base stations 16 are connected to the PSTN 12. PHS handsets (or other devices such as digital modems) 18 communicate with other devices coupled to the PSTN 12 via the base stations 16 using wireless communication.

AIN (Advanced Intelligent Network) system 22 includes one or more STPs (signal transfer points) 24 coupled to the PSTN 12. The STPs 24 are coupled to one another and to a plurality of SCP (service control point) pairs 26. Each SCP pair 26 comprises two fully redundant SCPs 26*a* and 26*b*, which are described in greater detail herein below. STPs 24 are also connected to an NCC (network control center) 28, an SMS (service management system) 30 and VMS (voice mail system) 32. NCC 28, SMS 30 and VMS 32 are coupled to SCP pairs 26. NCC 28 includes a CGTT (Centralized Global Title Table) 34.

In operation, calls which originate or terminate on a PHS device 18 use the AIN circuitry 22 for information. Among other information, the SCPs 26 provide a database of information including transient data regarding the current base station 16 associated with each mobile device 18, voice mail information for each mobile device 18 which has subscribed to the voice mail option, other options, such as call blocking, and billing information. When a call is placed to or from a mobile device 18, a query is made to the SCP to determine the relevant information.

For example, if a call is made from a first mobile device 18, having an assigned PSN (phone system number) of 050-888-7777 to second mobile device, having an assigned PSN of 050-888-6666, the following transactions may occur. First, the devices are identified as being mobile (in this case PHS) devices by certain digits in their respective PSNs. In this example, it is assumed the "050" identifies PHS devices and the "888" identifies the PHS provider (although any combination of numbers could be used). Accordingly, to complete the call, the PSTN must determine which base station 16 is currently associated with the receiving device. Second, if there is voice mail associated with either the calling or receiving devices, this information should be forwarded to the device (which may, for example, enable a light on the phone to notify the user of the available voice mail). Third, the calling or receiving devices 18 may subscribe to one or more restriction options, which prevent certain calls from being made or received. Thus, if the calling device 18 is restricted from making long distance calls, the call will not be completed (and the caller notified) if the receiving device is associated with a base station which would require a long distance call. Alternatively, the receiving device may list the PSN of the calling device as a device from which it does not want to receive calls. If such is the case, the call will be blocked (and the caller notified). Fourth, one of the device 18 may be in arrears, or may have canceled service, in which case the call would not be completed.

While the transactions described above are described in connection with a call from a first PHS device 18 to a second PHS device 18, queries to at least one of the SCPs 26 are made whenever a call involves a PHS device 18 as either a calling or a receiving party, even if the other party is not a PHS device.

Because the SCPs 26 are involved in any call involving a PHS device 18, their databases can grow quickly. Further, as the databases grow, there cannot be a noticeable reduction in the speed with which the SCP services are rendered. Also, the data in the SCPs 26 must be protected against any loss due to failure of a single SCP.

In the embodiment shown in FIG. 1*a*, pairs of SCPs 26 are fully redundant, i.e., each SCP 26*a* and 26*b* of the pair has an identical database (subject to short term variations which are resolved by the synchronization procedures described below). Each SCP pair 26 is assigned to a subset of the devices. In the preferred embodiment described herein, each SCP pair 26 is assigned to one or more ranges within the PSNs associated with the PHS system. For example, a first SCP pair 26 could be assigned to PSN ranging from 888-0000 to 888-3333 and a second pair could be associated with PSNs ranging from 888-3334 to 888-7777 (in an actual embodiment, the number of PSNs associated with each SCP pair would be much greater). The CGTT 34 maintains a database defining the ranges for each SCP pair. This information is distributed to other devices in the AIN system as needed.

Within the range of PSNs associated with a SCP pair 26, each SCP in the pair 26 has a redundant database. However, to increase efficiency, each SCP 26*a* and 26*b* is assigned to respond to half of the query load. If one SCP 26*a* or 26*b* becomes inoperable, the other SCP (the mate SCP) can respond to the entire load until such time that the failing SCP is returned to service. Thus, for each PSN, a "primary" SCP is defined as the SCP which will respond to queries for that PSN while both SCPs are running. During operation, data between the SCPs 26*a* and 26*b* can lose synchronization. For example, as a device changes between base stations, this information (referred to herein as "transient" information) will be reported to the SCP assigned to the primary SCP of the pair. Similarly, voice mail information from the VMS 32 will be reported to the primary SCP of the pair for the affected device. The SCPs exchange transient and voice information as described in connection with FIGS. 17–19 in order to maintain the redundancy of the databases.

The AIN system 22 of FIG. 1a uses multiple SCP pairs 26. Each SCP pair 26 is responsible for providing services for a portion of the subscriber database. The CGTT defines which SCP pairs 26 are responsible for which subscribers by associated one or more ranges of telephone numbers with each SCP pair. By associating a portion of the subscriber database to each SCP pair 26, rather than the entire subscriber database, the response time of the SCPs is greatly increased.

Additionally, as described more fully hereinbelow, SCP pairs 26 can be added to the AIN system as needed. Thus, as the subscriber database grows, the AIN services can continue to respond in a timely fashion by adding SCP pairs and migrating subscriber records to the new SCP pair, as described in connection with FIGS. 23a–e. The addition of a new SCP pair can be accomplished without cessation of services and without any loss of data.

SCPs 26 may be coupled to SMS 30 via dedicated point-to-point X.25 links. SCPs 26a and 26b of a pair are generally physically located in different cities and may be coupled together via some communications line such as a point-to-point wide area network (WAN) link or a Media Access Control (MAC) bridge.

Figure 1B:
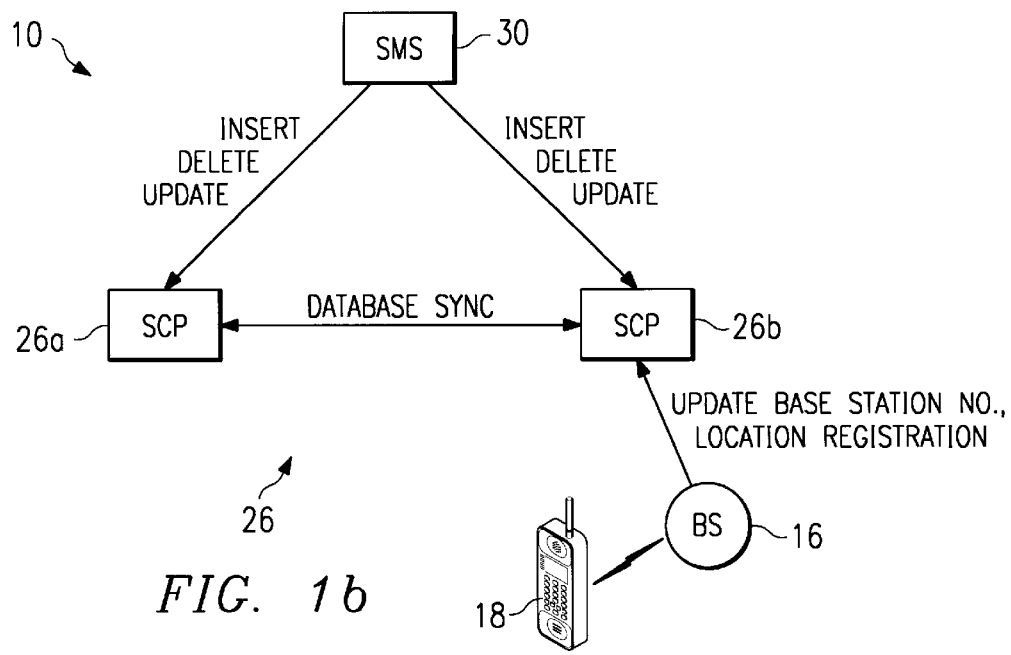
FIG. 1b is a simplified block diagram illustrating the relationship between a Service Management System (SMS), a Service Control Point (SCP) and its mate SCP, and a base station (BS) in wireless communication with subscribers' telephone equipment.

Some exemplary messages that are transmitted between SMS 30, SCPs 26, and base station 16 are shown in FIG. 1b. When a new subscriber using a portable handset 18 is being added to communications network 10, SMS 30 issues an INSERT command to add a new unique personal subscriber number or telephone number to both SCPs 26a and 26b in the appropriate pair as defined by the CGTT 34. A subscriber who no longer desires wireless service can be deleted in a similar manner with DELETE messages to both SCPs 26a and 26b. SMS 30 may also issue UPDATE messages to provide information, such as add a new service, to SCPs 26a and 26b. These messages are examples of static data updates.

As a portable handset roams, its location may change from the coverage area of one base station to another. Updates of base station numbers are provided by the base station 16 currently covering the portable handset to primary SCP 16, so that incoming calls to the portable handset can be routed to that base station. Further, outgoing calls to another portable handset may begin with a query to primary SCP 16 of the location registration of the destination portable handset. A database synchronization process is performed periodically and/or on demand between SCP 26a and 26b to update the respective copies of the SCPs with this transient data.

Figure 1C:
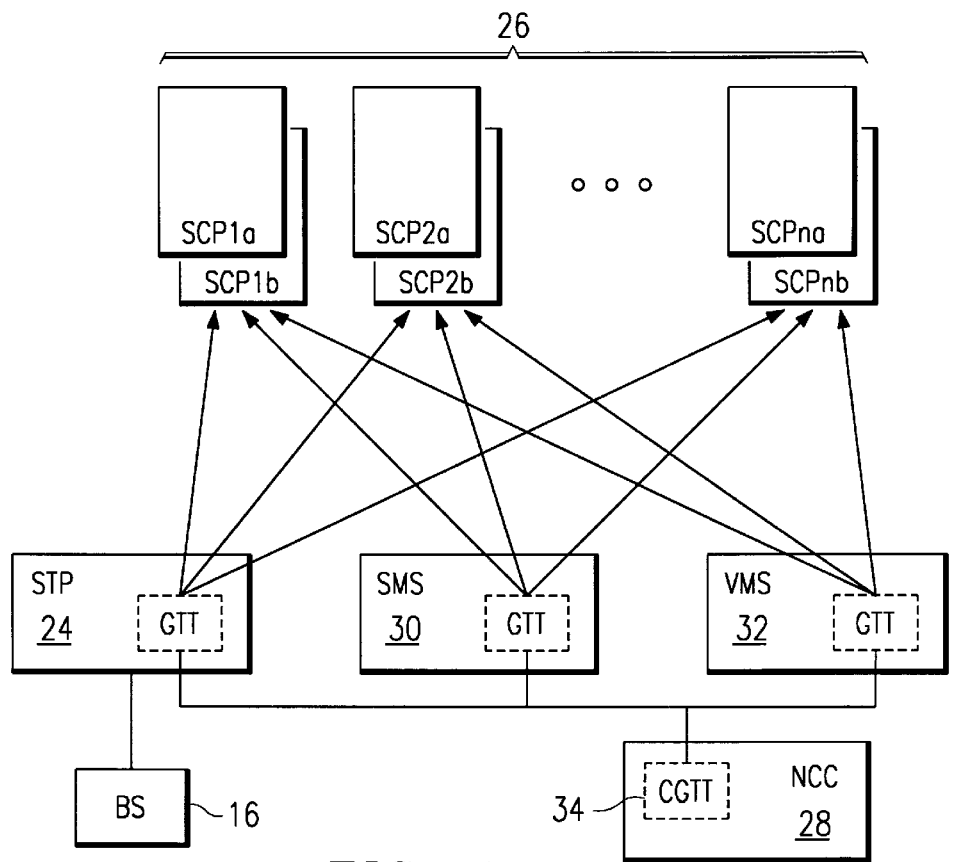
FIG. 1c is a simplified block diagram of various devices coupled to multiple SCP pairs.

FIG. 1c illustrates a block diagram of various devices coupled to multiple SCP pairs 26, individually referenced as SCP1, SCP2 and SCPn. Each pair is coupled to the SMS 30, VMS 32 and BSs 16 (through an STP 24). Each of the devices, SMS 30, VMS 32 and the STPs 24, contain a global title table (GTT) which is updated from the NCC 28. The GTT directs the associated device to the proper SCP pair 26 in accordance with a given number. Thus, for example, if VMS 32 has voice mail data associated with the number 050-888-7777, it will reference its internal GTT to determine which of the SCP pairs 26 maintains the database for 050-888-7777. The VMS 32 will then begin a communication session with the appropriate SCP pair 26 based on the information in its GTT. As is discussed in greater detail hereinbelow, the ability to distribute the SCP database among multiple SCP pairs provides for flexible sizing of the telephone system. For example, if each SCP pair has the capacity to handle five million users, as the capacity of the telephone system 10 approaches five million customers, an additional SCP pair 26 could be added as described hereinbelow. Additional SCP pairs could be added as needed.

Figure 2:
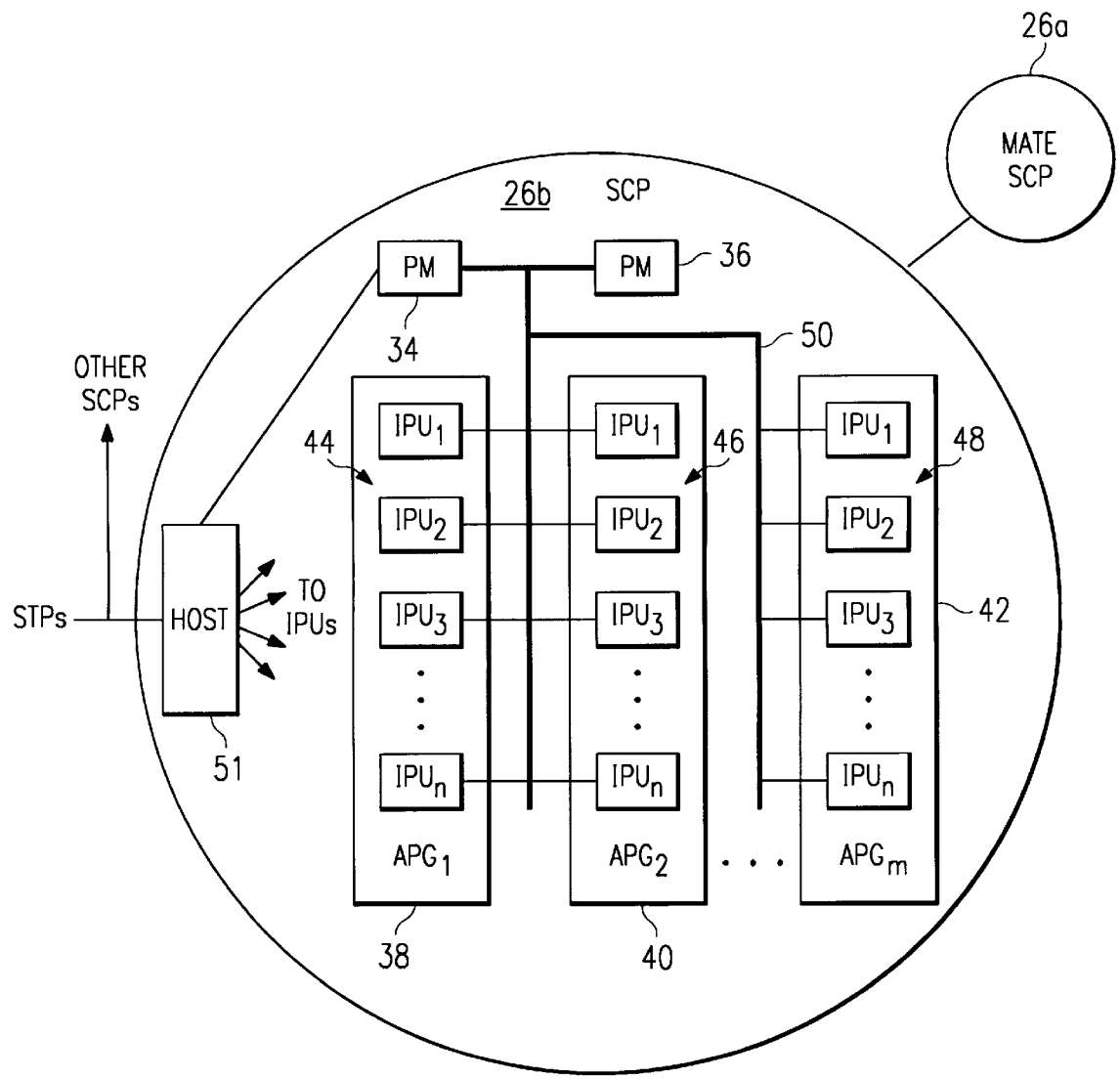
FIG. 2 is a block diagram of a Service Control Point (SCP) constructed according to the teachings of the present invention.

FIG. 2 provides a more detailed block diagram of a SCP 26b coupled to its mate SCP 26a constructed according to the teachings of the present invention. Each SCP includes an active Platform Manager (PM) 34 and a standby Platform Manager 36 coupled by a bus, local area network (LAN), or a local area network hub 50 to a predetermined number of Application Processor Groups ($APG_1$–$APG_m$) 38–42. To provide greater network integrity and fault tolerance, dual LAN or hubs may be used to connect the PMs to the APGs to provide redundancy. Each APG 38–42 includes a plurality of Intelligent Processor Units ($IPU_1$–$IPU_n$) 44–48. One or more IPU may be configured as a spare or standby IPU that may be brought on-line as another IPU fails. A host 51 interfaces between the STPs 24 and the IPUs of the SCP. A route table, described below, directs queries to the correct IPU. The route table is managed by the PMs and is distributed to the host 51 and to the IPUs. By distributing the route table to the host 51 and the IPUs, queries from the STPs can be quickly routed to the correct IPU.

Figure 3:
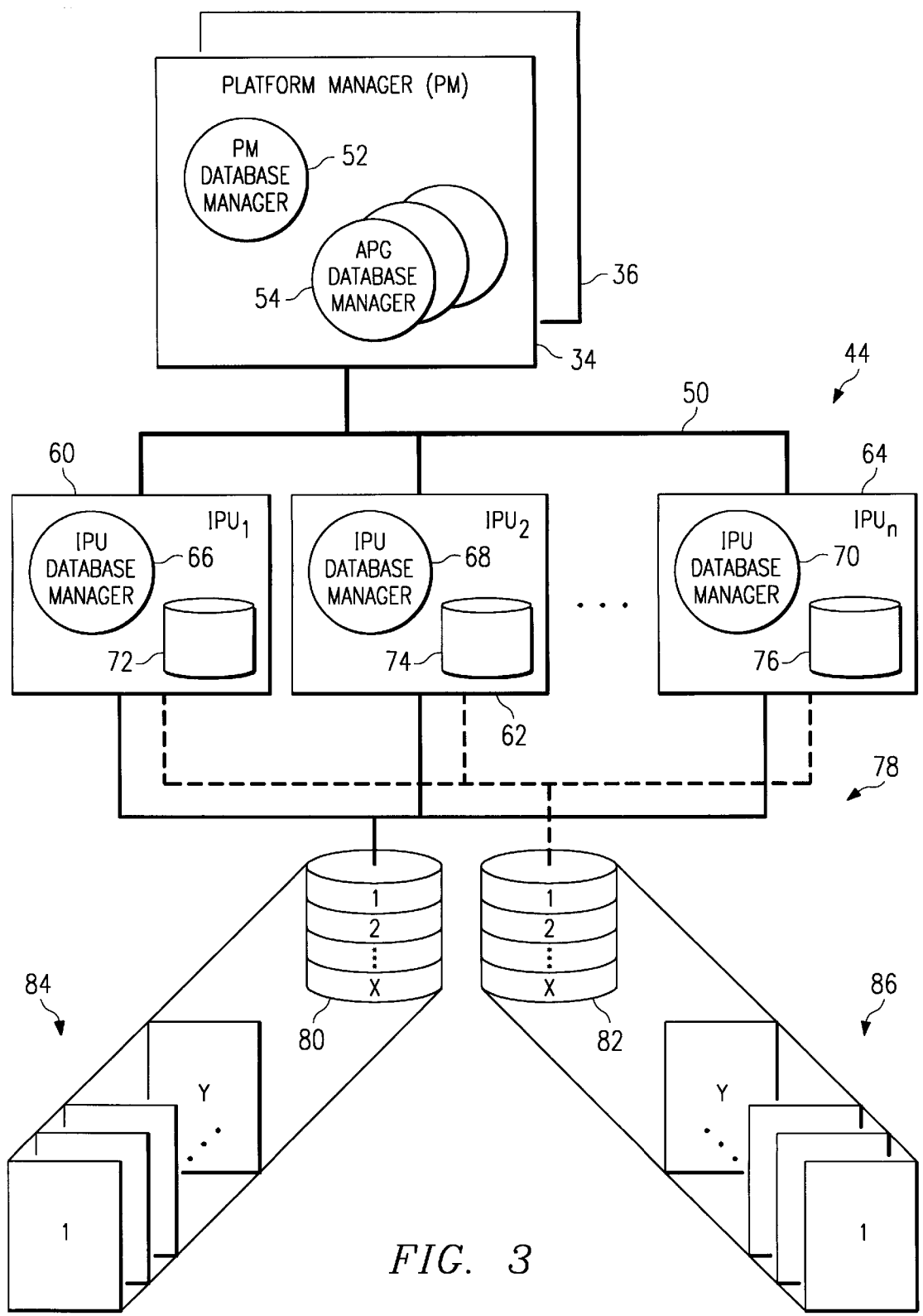
FIG. 3 is a more detailed block diagram of the SCP according to the teachings of the present invention.

Referring to FIG. 3, it may be seen that each Platform Manager 34 and 36 includes a PM Database Manager process 52 and an APG Database Manager process 54 for each APG. Each $IPU_{1-n}$ 60–64 also has an IPU Database Manager process 66–70 and shared memory 72–76 residing therein. Shared memory 72–76 may be implemented by any fast memory device, including random access memory (RAM) devices, and is accessible to all the processes residing in the IPUs. A pair of mirrored memory storage devices 80 and 82 are coupled to each IPU 60–64, where IPUs 60–64 may all access the memory storage devices 80 and 82 simultaneously. Simultaneous file access may be accomplished by implementing memory storage devices 80 and 82 with multi-port media, or by running IPUs 60–64 in a multi-initiator mode to each memory device 80 and 82. Memory storage devices 80 and 82 may be implemented with solid state disks or any other suitable storage media. In the multi-initiator mode, memory storage devices 80 and 82 may each be coupled to IPUs 60–64 by a separate bus or Small Computer Systems Interface (SCSI). Constructed and configured in this manner, any one of IPUs 60–64 has access to both memory storage devices 80 and 82.

Memory storage devices 80 and 82 may be segmented into a predetermined partitions or filesystems, where X of them are used to store subscriber files. The portable handset subscriber database is comprised of a fixed number of files which are stored on mirrored disks of APGs 38–42 of SCP 30, where there is a pair of mirrored disks per APG. A subset of subscriber records in the entire subscriber database is assigned to each subscriber file. Each subscriber file is assigned to be stored in a specific filesystem on a specific pair of mirrored disks in the SCP, such that each APG services an exclusive subset of the subscriber database. As shown in FIG. 3, the number of files that may be stored on a pair of disks is Y. The pair of disks are mirrored, so that the contents of the disks, if both are operational, are always the same.

To access a particular file on a given pair of disks, the filesystem containing that file has to be mounted to a directory on an IPU in the APG, where a filesystem can be mounted on only one IPU at a time. When a filesystem is mounted on an IPU, its files are mapped into the shared memory of the IPU. During typical operations, each filesystem is assigned to a particular IPU and is mounted and mapped into the shared memory of the IPU so that the data contained therein is readily accessible to all the processes operating in the IPU. Transient data updates containing subscriber location information and the like are made only to the shared memory of the IPU, but static data updates such as subscriber additions, deletions, or service modifications, are written immediately out to disk as well as updated in the shared memory. On an ongoing basis, configurably-sized sections of the files mapped to an IPU's shared memory, including transient data updates, are written out to the mirrored disks simultaneously to update the copy contained therein. The result of this ongoing write operation is to continuously cycle through the mapped shared memory files at a configurable interval so that no excessive input/output or CPU peaks are required to update the disk copies. Thus, possible intermittent service delays are avoided by the continuous writing of small sections of the files to disk.

Figure 3A:
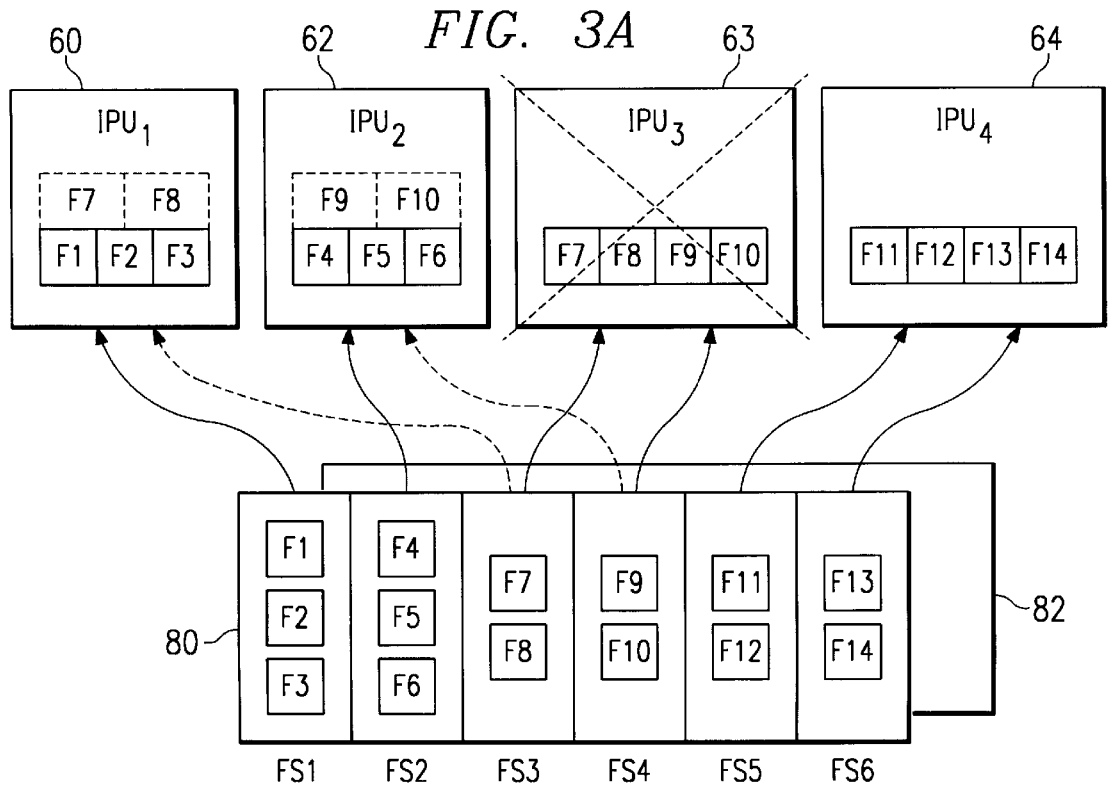
FIG. 3A is a more detailed block diagram of file distribution and redistribution due to IPU failure according to the teachings of the present invention.

Referring to FIG. 3A, an exemplary block diagram of file distribution and redistribution to the IPUs in an APG is shown. If disks 80 and 82 each have six partitions or filesystems FS1–FS6, for example, each filesystem may have two or three files of the set of files F1–F14. In an initial distribution of the files, $IPU_1$ 60 may mount FS1 and map files F1–F3 to its shared memory; $IPU_2$ 62 may mount FS2 and map files F4–F6 to its shared memory; $IPU_3$ 63 may mount FS3 and FS4 and map files F7–F10 to its shared memory; and $IPU_4$ 64 may mount FS5 and FS6 and map files F11–F14 to its shared memory. Each IPU may then access only the subscriber records in the files in the filesystem(s) it has mounted. The APG services, as a whole, all the subscribers in all the files allocated to it. Subsequently, if $IPU_3$ 63 goes down, the files F7–F10 in filesystems FS3 and FS4 are redistributed to one or more of the remaining IPUs. In the example illustrated in FIG. 3A, the files in FS3 and FS4 are redistributed to $IPU_1$ 60 and $IPU_2$ 62 so that service to those subscribers having information stored in files F7–F10 may continue without interruption. Accordingly, the file distribution is reconfigured as IPUs come into service or go out of service.

As further examples, a configuration of two APGs, six filesystems used per disk in each APG, and 32 subscriber files may have an exemplary file assignment shown below:

TABLE I

| APG | Filesystem | Subscriber File Index |
|-----|------------|----------------------|
| 1 | FS1 | 0, 1, 2 |
| 1 | FS2 | 3, 4, 5 |
| 1 | FS3 | 6, 7, 8 |
| 1 | FS4 | 9, 10, 11 |
| 1 | FS5 | 12, 13 |
| 1 | FS6 | 14, 15 |
| 2 | FS7 | 16, 17, 18 |
| 2 | FS8 | 19, 20, 21 |
| 2 | FS9 | 22, 23, 24 |
| 2 | FS10 | 25, 26, 27 |
| 2 | FS11 | 28, 29 |
| 2 | FS12 | 30, 31 |

It may be seen that the 32 subscriber information files are evenly distributed to the APGs with half of the load, or 16 files, residing on the mirrored disks of each APG. If each APG has three active IPUs, then each IPU may be assigned two filesystems, which are then mounted and mapped into its shared memory. If each APG has four IPUs, then two of the IPUs may be assigned two filesystems, and the remaining two may be assigned one filesystem each. One or more spare IPUs may also be included in each APG that remains in the standby mode until an IPU failure is encountered.

The personal subscriber number (PSN) or call number is used to determine the file index of the file storing the information related to that account. For example, in the above instance where the database is segmented into 32 files, a modulo or MOD 32 operation is performed on selected digits of the personal subscriber number to yield the subscriber file index. For most applications, the last four or five digits of the personal subscriber number may be used in the MOD operation to yield the file index.

To support 3–4 million subscribers, for example, the subscriber information database may be segmented into 128 files. If five APGs are used to support the system, an exemplary file assignment is shown below.

TABLE II

| APG | Filesystem | Subscriber File Index |
|-----|------------|----------------------|
| 1 | FS1 | 0, 1, 2, 3, 4, 5 |
| 1 | FS2 | 6, 7, 8, 9, 10, 11 |
| 1 | FS3 | 12, 13, 14, 15, 16, 17 |
| 1 | FS4 | 18, 19 |
| 1 | FS5 | 20, 21 |
| 1 | FS6 | 22, 23 |
| 2 | FS7 | 24, 25, 26, 27, 28, 29 |
| 2 | FS8 | 30, 31, 32, 33, 34, 35 |
| 2 | FS9 | 36, 37, 38, 39, 40, 41, 42 |
| 2 | FS10 | 43, 44 |
| 2 | FS11 | 45, 46 |
| 2 | FS12 | 47, 48, 49 |
| 3 | FS13 | 50, 51, 52, 53, 54, 55 |
| 3 | FS14 | 56, 57, 58, 59, 60, 61 |
| 3 | FS15 | 62, 63, 64, 65, 66, 67 |
| 3 | FS16 | 68, 69 |
| 3 | FS17 | 70, 71, 72 |
| 3 | FS18 | 73, 74, 75 |
| 4 | FS19 | 76, 77, 78, 79, 80, 81 |
| 4 | FS20 | 82, 83, 84, 85, 86, 87 |
| 4 | FS21 | 88, 89, 90, 91, 92, 93 |
| 4 | FS22 | 94, 95 |
| 4 | FS23 | 96, 97, 98 |
| 4 | FS24 | 99, 100, 101 |
| 5 | FS25 | 102, 103, 104, 105, 106, 107 |
| 5 | FS26 | 108, 109, 110, 111, 112, 113 |
| 5 | FS27 | 114, 115, 116, 117, 118, 119 |
| 5 | FS28 | 120, 121 |
| 5 | FS29 | 122, 123, 124 |
| 5 | FS30 | 125, 126, 127 |

In the example above where the database is segmented into 128 files, a modulo 128 operation on the last four or five digits of the personal subscriber number may be performed to yield the file index of the file in which subscriber information of this call number is located. Therefore, information about a particular subscriber can be located quickly in the database.

It is important to note that the default or initial file assignment may be modified subsequently depending on load and traffic conditions. Each IPU maintains statistics on the number of queries it receives and reports the statistics. The file assignments may then be redistributed so that any IPU is not overworked. Details of load balancing to achieve a more even distribution is described below.

Accordingly, PM Database Manager 52 is primarily responsible for database load balancing of the IPUs in SCP 30, and APG Database Manager 54 is primarily responsible for the management of the database loads on IPUs in the respective APG. The IPUs have at least three service states: IN_SERVICE, OS_MIN, and OUT_OF_SERVICE. PM Database Manager 52, APG Database Manager 54, and IPU Database Manager 66–70 may coordinate to unmount filesystems from OS_MIN and OUT_OF_SERVICE IPUs and redistribute the filesystems to the remaining IN_SERVICE IPUs. Files may also be moved among filesystems to evenly distribute the load carried by each IPU and APG. Details on the operating states of the processes are discussed in the co-pending U.S. patent application, Ser. No. 08/526,953, titled *System and Method for Multi-Site Distributed Object Management Environment*, which is incorporated by reference herein.

Figure 4:
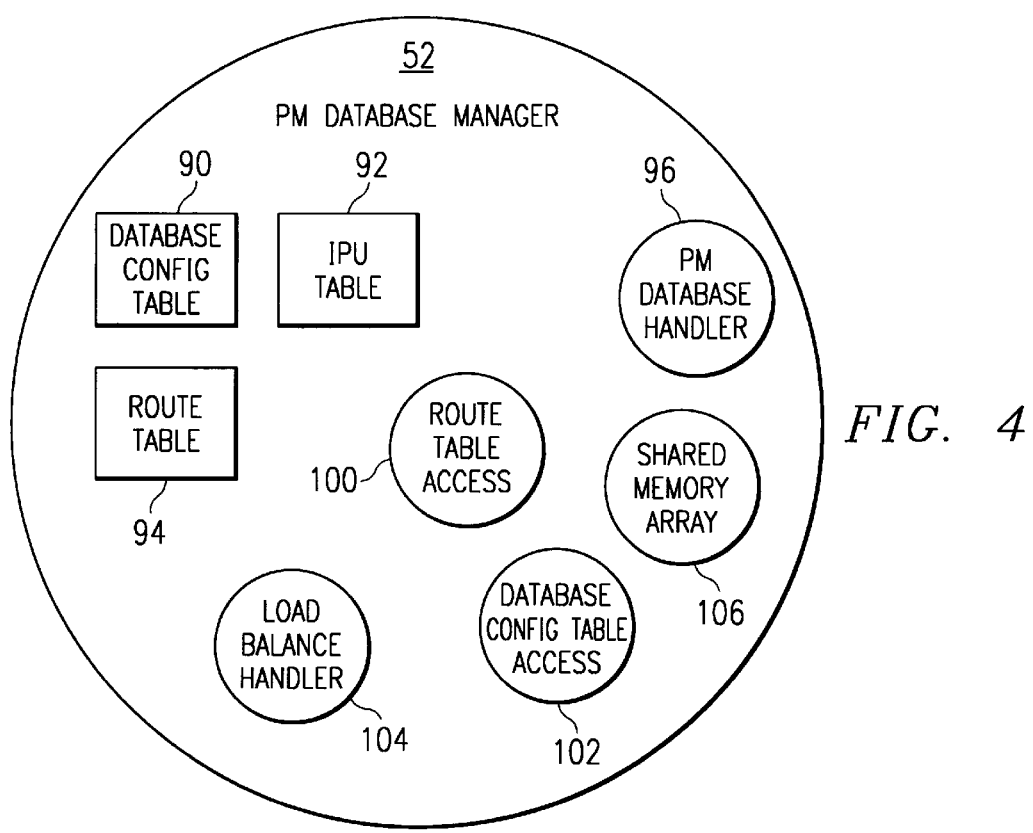
FIG. 4 is an object diagram of a Platform Manager (PM) Database Manager.

Referring to FIG. 4, a PM Database Manager 52 may include a database configuration table 90 and an IPU table 92 to handle the database configuration. Database configuration table 90 basically maintains information for each filesystem in the entire database, including:

1. filesystem name
 2. default IPU name
 3. current IPU name
 4. APG ID
 5. number of files in the filesystem
 6. a map of the files in the filesystem The default IPU is the IPU that the filesystem was initially assigned to; the current IPU is the IPU that presently mounted the filesystem as affected by database reconfiguration and/or load balancing. IPU table 92 maintains information for each IPU in the system, and may include:

1. IPU name
 2. APG ID
 3. number of files on the IPU currently
 4. number of filesystems on the IPU currently A third table, route table 94, is also maintained by PM Database Manager process 52. Route table 94 contains information for each file in the database. It is used to supply the routing information to the host (see FIG. 2), such as a Message Transport Network (MTN), coupled to the PMs, so that the host may direct queries to the appropriate IPU depending on each IPU's database load. Route table may include:

1. subscriber file index
 2. name of IPU that file is currently on
 3. IPU ID

All three tables are persistent and replicated as known in the art. All updates and replications of these tables are handled by another subsystem not described in detail herein.

PM Database Manager process 52 includes a number of objects to perform the task of managing the database. A short description follows, but more detailed discussion of the function of these objects are set forth below in conjunction with references to FIGS. 7–16. As shown in FIG. 4, PM Database Handler 96 performs load balancing among the IPUs, and for handling solicited requests from the host for routing information. Route Table Access 100 and Database Config Table Access 102 are objects residing in PM Database Manager 52 that control access to route table 94 and database configuration table 90, respectively. Load Balance Handler 104 is an object that contains the processing methods for load balancing files and filesystems. Shared Memory Array 106 is an array of Boolean values in shared memory 72–76 (FIG. 3) which is used to synchronize load balancing and reconfiguration between PM Database Manager 52 and APG Database Manager 54.

Figure 5:
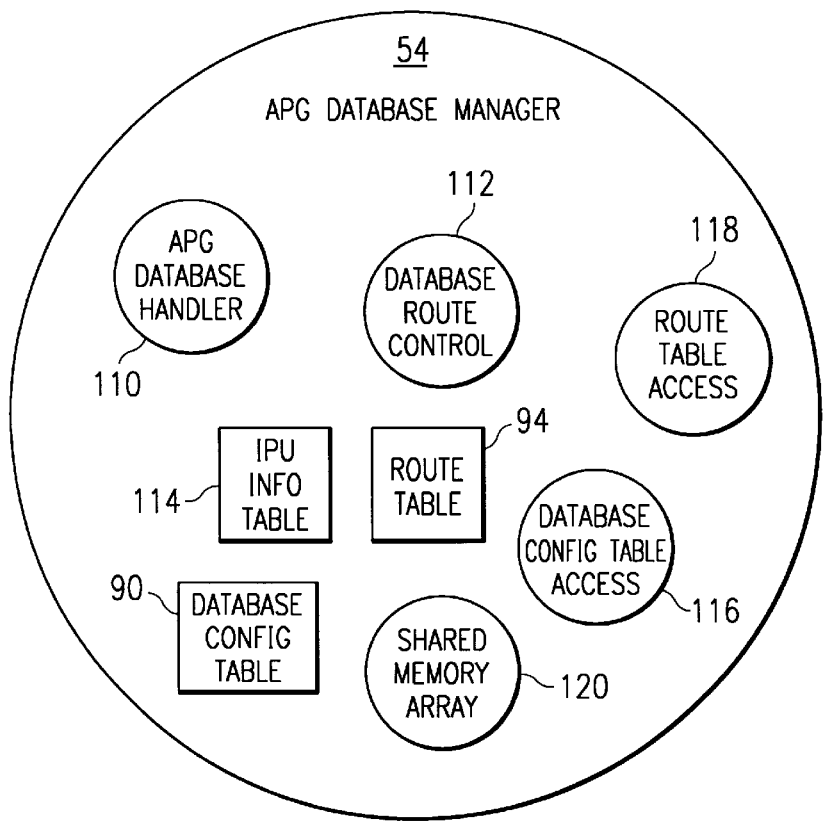
FIG. 5 is an object diagram of an Application Processor Group (APG) Database Manager.

FIG. 5 shows a typical composition of APG Database Manager 54, which may include APG Database Handler 110 for providing APG Database Manager 54 an interface to IPU Database Manager 66–70 and other processes, and further provides methods to be invoked on IPU removes and restores. Database Route Control 112 contains various processing methods for reassigning filesystems to handle different situations of IPU restores, removes, and auditing. It also contains information about the APG itself. IPU info table 114 is a table that maintains information specific to IPUs within the APG, including the current IPU service status. Similar to PM Database Manager 52, APG Database Manager 54 also includes Database Config Table 90, Database Config Table Access 116, Route Table Access 116, Route Table 94, and Shared Memory Array 120 to control access to the data in the respective table.

Figure 6:
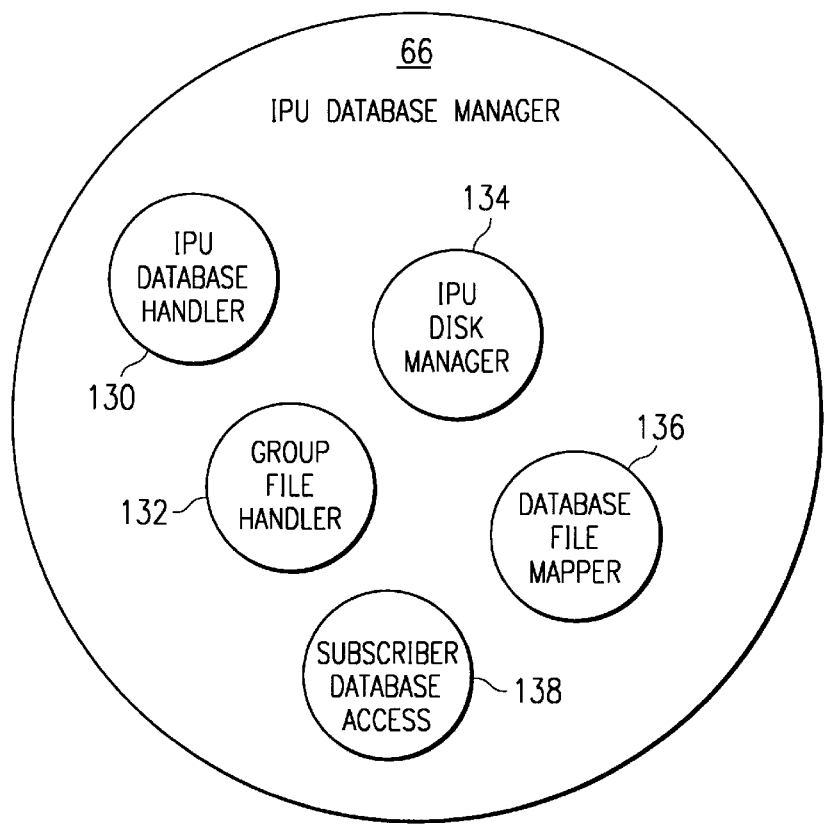
FIG. 6 is an object diagram of an Intelligent Processor Unit (IPU) Database Manager.

Referring to FIG. 6, IPU Database Manager 66 may include a number of objects, such as an IPU Database Handler 130 which provides an interface to APG Database Manager and the application processes on IPU node 60–64 (FIG. 3). IPU Database Manager 66 is also responsible indirectly for mounting and unmounting filesystems on the IPU node and mapping and unmapping the database files to and from shared memory 72 (FIG. 3). Process 66 Object 130 also communicates new database load information to the application processes on the node.

A Group File Handler 132 is an object that is responsible for periodically synchronizing the database files that are in shared memory 72 (FIG. 3) to the mirrored disks 80 and 82 (FIG. 3). An IPU Disk Manager object 134 is instantiated by IPU Database Handler 130 and is responsible for performing the mounting and unmounting of the filesystems. A Database File Mapper object 136 is responsible for mapping and unmapping files to and from shared memory. There is one Database File Mapper 136 per file on the IPU node. A Subscriber Database Access object 138 is responsible to provide processes on remote nodes access to the portion of the database handled by this particular IPU. Remote nodes include nodes residing on mate SCP 26a (FIG. 2), for example.

The operations of distributed redundant database is described in more detail by the flowcharts and block diagram in FIGS. 7–19, which are discussed in turn below. FIGS. 2–6 can be referenced where necessary, when specific structures are discussed.

Figure 7:
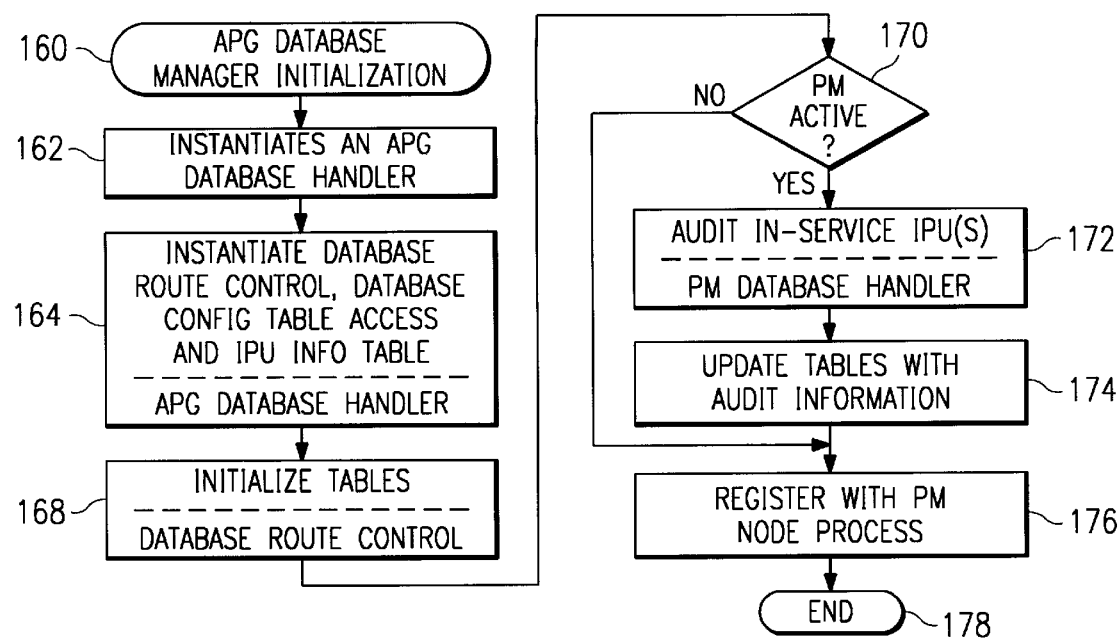
FIG. 7 is an exemplary flowchart of an APG Database Manager initialization process.

APG Database Manager 52 first instantiates an APG Database Manager 54 for each APG in the SCP. FIG. 7 is an exemplary process flow for APG Database Manager initialization beginning in block 160. First, an APG Database Handler object 110 is instantiated, as shown in block 162. In block 164, APG Database Handler 110 then instantiates Database Route Control 112, Database Config Table Access 116, and IPU Info Table 114. Database Route Control object 112 then instantiates and initializes all the tables 90–94 in APG Database Manager 52, as shown in blocks 166 and 168. If the PM is active, as determined in block 170, then an audit is performed of IN_SERVICE IPU(s) by APG Database Handler 96 in block 172. The audit yields the database load(s) of audited IPU(s), which is used to update the tables with this information, as shown in block 174. Subsequently in blocks 176 and 178 APG Database Manager 54 registers itself with the PM node process before ending the initialization process. The act of registration reveals the object's instance to other processes, so that others may communicate therewith.

Figure 8:
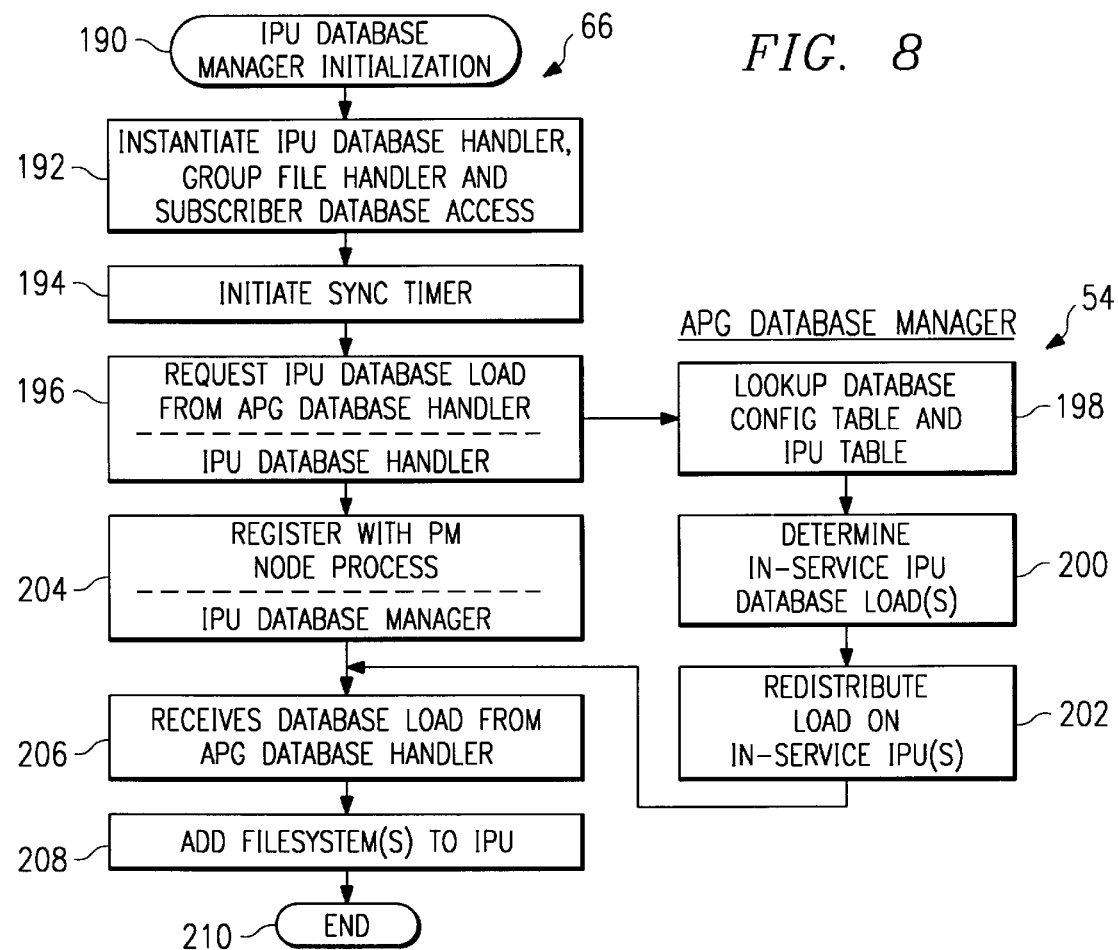
FIG. 8 is an exemplary flowchart of an IPU Database Manager initialization process.

FIG. 8 illustrates an exemplary process flow for IPU Database Manager initialization 190. In block 192, instances of IPU Database Handler 130, Group File Handler 132 and Subscriber Database Access 138 objects are instantiated. A sync timer used for shared memory-to-disk updating is initiated in block 194. IPU Database Handler 130 then requests for its share of the database load from APG Database Handler 110, as shown in block 196. In response, APG Database Manager 54 looks up database configuration and IPU tables for information on the filesystems and the requesting IPU, with this information, IN_SERVICE IPU database loads are determined based on the number of IPUs that are IN_SERVICE and traffic conditions, as shown in blocks 198 and 200. Database loads are distributed to the requesting IPU in block 202. IPU Database Manager 66 then registers itself with the PM node process, as shown in block 206. IPU Database Manager then receives the load, as shown in block 204. The filesystem(s) belonging to the portion of the database that are assigned to the IPU are then added or mounted to the IPU, as shown in block 208. The initialization process subsequently ends in block 210.

FIG. 9 shows the process flow in the APG Database Manager when a Platform Manager 34 transitions from the standby mode to the active mode, beginning in block 230. All the APG Database Managers 54 operating on the Platform Manager perform an audit of their IPU database loads, as shown in block 232. Database Route Controls 112 of each APG then initializes all tables, including database config table 90, route table 94, and IPU table 92. APG Database Handler 110 then obtains a list of IN_SERVICE IPU(S) for its APG, and queries each IN_SERVICE IPU for its database load, as shown in blocks 236 and 238. The tables are reconstructed and updated with the information supplied by the IN_SERVICE IPUs, as shown in block 240. Also dependent on this audit information, unassigned filesystem(s) are assigned to those IN_SERVICE IPU(s) that are lightly loaded, and IPU(s) with no load assigned are assigned their default database load, as shown in blocks 242 and 244. The new database load distribution results in new routing information in route table 94, which is provided to the host by APG Database Handlers 110. The standby-to-active transition process ends in block 248.

IPU failures are handled by the process flow shown in FIG. 10 beginning in block 250. In block 252, APG Database Manager 54 receives notification of an IPU failure from the PM node process. A timer is set for each failed IPU, as shown in block 254. If APG Database Manager 54 receives an IPU IN_SERVICE notification prior to the timer's expiration, as determined in block 256, then nothing more needs to be done. However, if no such notification was received, and if an IPU exit notification is received or if the timer expires, as shown in block 258, the load carried by the failed IPU is reassigned and sent to the remaining IN_SERVICE IPUs, as shown in blocks 260 and 262. If any additional IN_SERVICE IPUs fail now, as determined in block 264, execution proceeds to block 260, where the database loads are again redistributed to the remaining IN_SERVICE IPUs. If no additional IPUs fail, as determined in block 264, then Database Route Control 112 extracts updated routing information from route table 94 and APG Database Handler provides this information to the host, as shown in blocks 266 and 268. The process ends in block 270.

To add filesystem(s) to an IPU, the exemplary process flow beginning in block 280 and shown in FIG. 11 may be used. IPU Disk Manager 134 mounts the filesystem(s) to be added to the appropriate IPU, as shown in block 282. The files in the mounted filesystem(s) are then mapped to shared memory by Group File Handler 132, as shown in block 284. Subscriber Database Access 138 then attaches to the shared memory files, as shown in block 286. Because records in the files are organized and searchable by accessing pointers in a Red-Black Tree data structure in the preferred embodiment, the Red-Black tree is corrected or rebuilt, if necessary. A Red-Black Tree is a balanced tree data structure that facilitates quick searches, where all the records in a file may be located by searching the nodes in the Red-Black Tree. Recall that the modulo operation yields the file index, and by searching the appropriate Red-Black Tree shared memory file, the specific record may be accessed. It is important to acknowledge that other data structures may be used without departing from the spirit of the invention. Thereafter, Subscriber Database Access 138 sends messages to all concerned applications about the new IPU file load, as shown in block 290. The process then ends in block 292.

Filesystem removal is also handled by IPU Database Handler 130, as shown in FIG. 12 and beginning in block 300. Subscriber Database Access 138 first detaches files from the shared memory, and then detaches applications from shared memory, as shown in blocks 302 and 304. Group File Handler 132 then deallocates shared memory segments, and IPU Disk Manager 134 unmounts the filesystems(s) in question, as shown in blocks 306 and 308. The filesystem removal process ends in block 310.

It has been noted above that database loads may be balanced among the IPUs in an APG so that an even distribution of query traffic is achieved. Further, because IPUs may fail or enter into one of the non-operational states (OS_MIN or OUT_OF_SERVICE), the database loads may need to be reconfigured or redistributed to the remaining IN_SERVICE IPUs. In order to synchronize load balancing and database reconfiguration between PM Database Manager 52 and APG Database Managers 54, instances of Shared Memory Array 120 are instantiated, one is Reconfig Array, an array of booleans in shared memory, and the other is Load Balance Flag, a Boolean flag also maintained in shared memory. If the database in a particular APG is being reconfigured due to one or more IPUs going down or re-entering service, the appropriate APG Database Manager 54 sets its corresponding flag in Reconfig Array. Once database reconfiguration is completed, APG Database Manager 54 resets its flag in Reconfig Array. Similarly, while load balancing is being performed, the Load Balance Flag is set by PM Database Manager 52.

Figure 14:
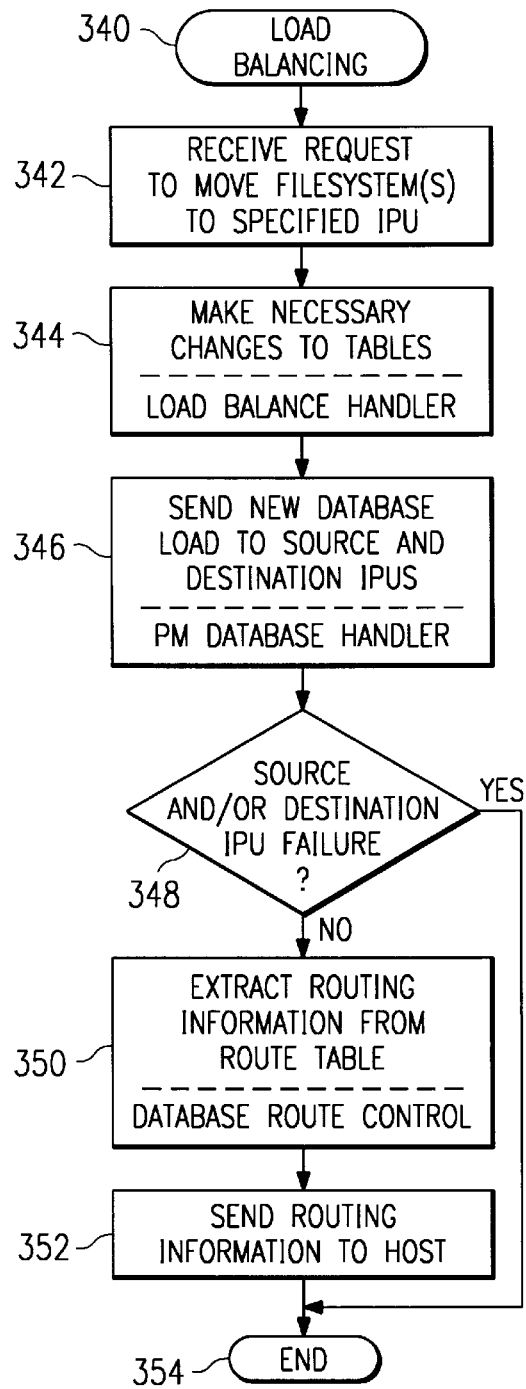
FIG. 14 is an exemplary flowchart of a load balancing process.
Figure 15:
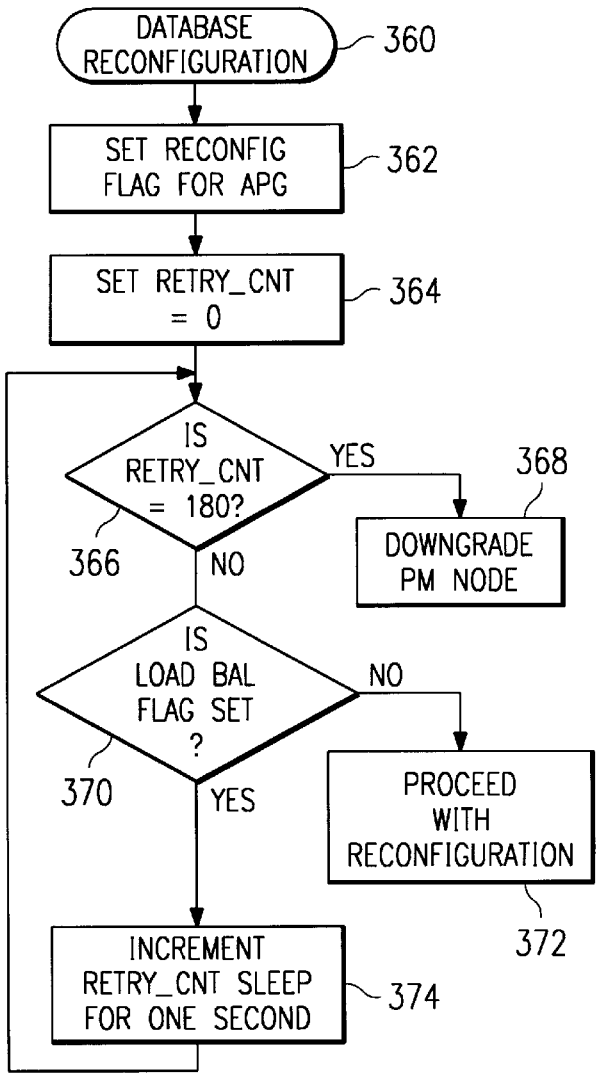
FIG. 15 is an exemplary flowchart of a database reconfiguration process.

FIGS. 13–15 are flowcharts demonstrating the process to synchronize load balancing and database reconfiguration. In FIG. 13, an exemplary load balance request process 320 is shown. A load balance may be requested by craft persons through a craft screen interface, by PM Database Manager 52, or by APG Database Manager 54. The Reconfig Array is first checked to see whether the Reconfig Flag is set for the APG in question, as shown in block 322. If the Reconfig Flag is set, then load balancing is simply aborted in block 324 and may be re-attempted at a later time. Because load balancing is not a critical operation, it is not required that load balancing waits for reconfiguration to complete, although such mechanisms may be instituted. If the Reconfig Flag for the APG is not set, then the Load Balance Flag is set, as shown in block 326, and load balancing is performed, as shown in block 328.

Load balancing is shown in exemplary flowchart in FIG. 14, beginning in block 340. A request to move one or more specific filesystems to one or more specific IPU is received, as shown in block 342. The request is likely to be generated by a craft person, or PM or APG Database Manager in view of the current load distribution and traffic conditions. In block 344, Database Route Control 112 makes the necessary changes to the tables to reflect the balanced load distribution.

The new database loads are provided to both source and destination IPUs by PM Database Handler 96, as shown in block 346. If at this time it is detected that the source and/or destination IPU failed, as shown in block 348, load balancing is simply terminated in block 354. Otherwise, Database Route Control 98 extracts the new routing information from route table 94 and provides it to the host, as shown in blocks 350 and 352.

FIG. 15 shows the process flow for beginning database reconfiguration, beginning in block 360. If database reconfiguration is desired, the appropriate Reconfig Flag is set for the APG, as shown in block 362. Next, a retry counter or timer (RETRY_CNT) is reset to zero, as shown in block 364. Execution then enters a loop in which the reconfiguration process waits for load balancing to complete if it is in progress. The retry counter is first checked to see if it has reached a predetermined upper limit, for example 180, as shown in block 368. If the upper limit has been reached, it is determined that the PM node has failed and its status is downgraded to the OS_MIN state. If the retry count has not yet reached the predetermined upper limit, then the Load Balance Flag is checked to see if it is set, as shown in block 370. If it is not set, then execution may proceed with database reconfiguration. Otherwise, the retry counter is incremented and a predetermined amount of time, for example one second, is permitted to elapse before returning to the beginning of the loop at block 366.

There are several data synchronization processes taking place in distributed redundant database 10. The data stored in the shared memory of each IPU is synchronized to both mirrored disks, and all modified transient data in the database of each SCP is provided to its mate SCP.

Figure 16:
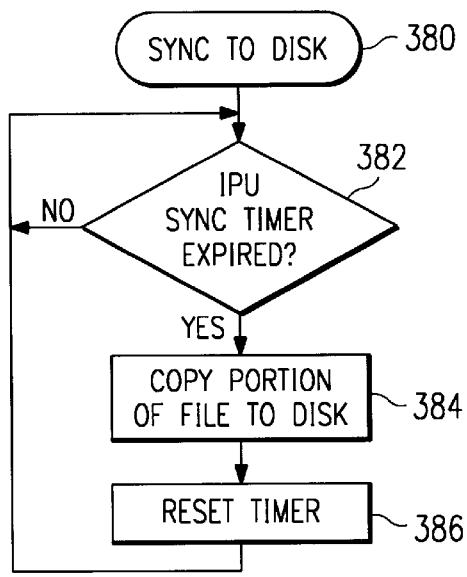
FIG. 16 is an exemplary flowchart of a shared memory and disk synchronization process.

FIG. 16 is an exemplary process flow 380 for synchronizing the data in the IPUs' shared memory 72–76 (FIG. 3) to mirrored disks 80 and 82 (FIG. 3). In block 382, the IPU sync timer is checked to determined whether it has expired. Recall that this timer was initialized during IPU Database Manager initialization, as shown in block 194 in FIG. 8. If the sync timer has not yet expired, a predetermined amount of time is permitted to elapse, and the timer is rechecked, until the sync timer is expired. The expiration of the sync timer indicates that it is time to copy a portion or block of a file in the shared memory to the mirrored disks, as shown in block 384. The sync timer is then reset, as shown in block 386, and execution returns to block 382. At the expiration of the sync timer next time, the next portion of the file is copied to disk. When an entire file has been copied, the next file is copied to disk. In this manner, all the files in the shared memory of each IPU are copied to disk. Because each IPU is assigned a different set of filesystems, the IPUs may "sync" to disk in parallel in the multi-initiated mode without interfering with each other's operations. It may be noted that this "sync" to disk process primarily updates the disks with transient data, such as subscriber current location. Static data such as adding or deleting new subscribers, service option updates, and subscriber preference data are immediately written to the mirrored disks generally simultaneously with writing the same data to the shared memory.

Figure 17:
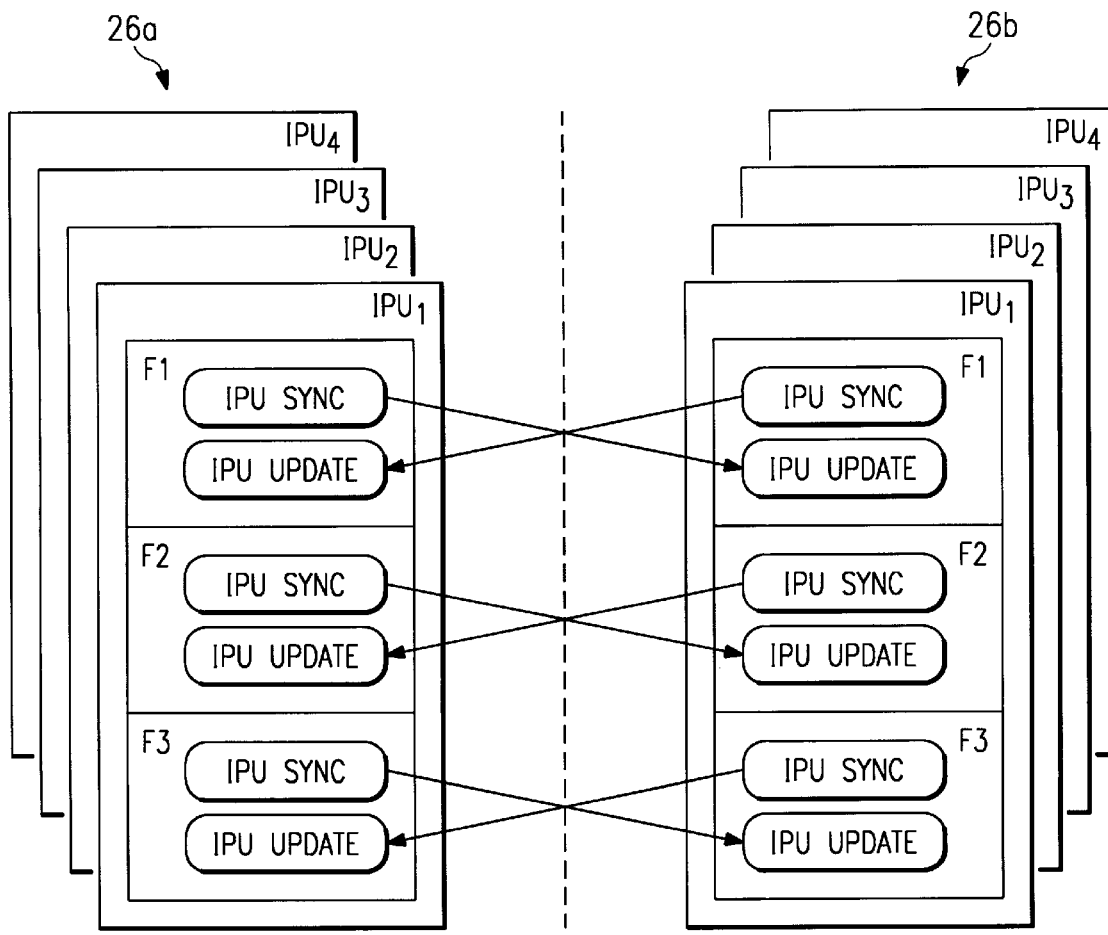
FIG. 17 is an exemplary flow diagram illustrating the process of synchronizing the databases of corresponding SCPs of an SCP pair.

FIG. 17 illustrates a simplified block diagram illustrating synchronization between SCP databases, such that each SCP 26a and 26b of a SCP pair 26 contains the same information. For purposes of illustration, it is assumed that each SCP 26a and 26b comprises three APGs (as shown in FIG. 2). In each of the three APGs, there are four IPUs, for a total of twelve IPUs per SCP. The subscriber database associated with an SCP pair 26 is divided into 128 individual files, so that each APG is responsible for 42 or 43 files. Each of the four IPUs in each APG is responsible for 7–43 files, depending upon how many IPUs are in service and the distribution of files between IPUs (see FIGS. 3 and 3A, above). Each IPU may contain multiple CPU processors for increased performance.

In operation, separate synchronization processes are for each file F1–F128. For each file, an IPUsync process determines which records have transient and/or voice mail which has changed and stores the changed records in a sync buffer. For each record, two flags are present to identify whether either the transient information or the voice mail information has changed since the IPUsync process last examined that record. When the sync buffer is full or the file has been searched completely, IPUsync sends the sync buffer to the corresponding IPU of its mate SCP (SCP 26a is the mate SCP for SCP 26b and SCP 26b is the mate SCP for SCP 26a). Additionally, for each file, a IPUupd process receives the sync buffer from the corresponding IPU of its mate SCP. Upon receiving the sync buffer from the mate SCP, the IPUupd process updates records in its associated file.

On each IPU, two processes, IPUsyncMain and IPUupdMain, are responsible for activating and managing the IPUsync and IPUupd processes for the files associated with that IPU.

In an alternative embodiment, there are four separate processes executing for each file: IPUsyncV (which scans the file for records in which the voice mail information has changed and outputs changed files to a voice mail sync buffer), IPUsyncT (which scans the file for records in which the transient information has changed and outputs changed files to a transient sync buffer), IPUupdV (which updates records in the mate SCP responsive to records in the voice mail sync buffer) and IPUupdT (which updates records in the mate SCP responsive to records in the transient sync buffer).

Figure 18:
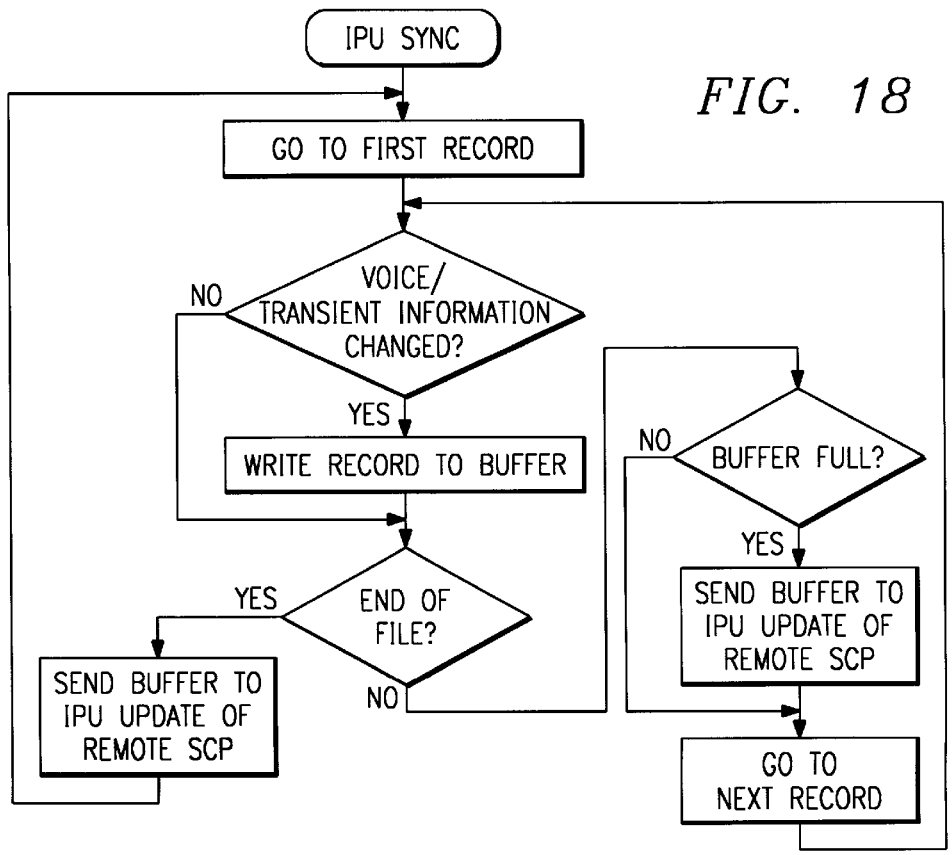
FIG. 18 is an exemplary flowchart of an IPU sync process used in synchronization of corresponding SCP databases.

FIG. 18 is a flow chart describing operation of the IPUsync process, in this case assuming that the IPUsync process is searching for records in which either the transient or the voice mail information has changed. Starting in the first record of the associated file in block 420, each record is checked to determine whether transient or voice mail information in the record has changed in decision block 422. If information has changed, the record is written to the sync buffer in block 424. If the information in the record has not changed in decision block 422, the process checks to see if it has reached the end of file in decision block 426 or if the buffer is full in decision block 428. If either of these conditions are true, the sync buffer is sent to the IPUupd process of the mate SCP. If neither condition is met, the next record is examined in block 432.

In the alternative embodiment of separate IPUsync processes for the transient and voice mail information of each file, the basic flow of FIG. 18 could be used with the exception that each process would search for either changes in transient data (in the case of IPUsyncT) or voice mail data (in the case of IPUsyncV) in decision block 422.

Figure 19:
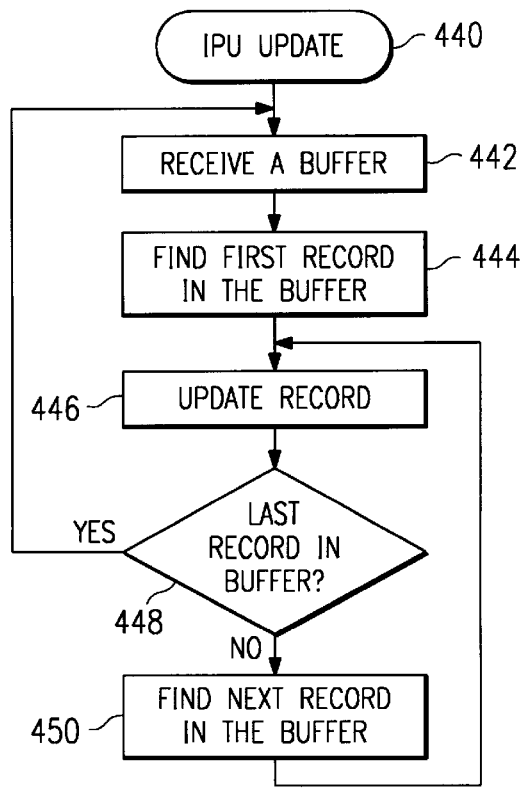
FIG. 19 is an exemplary flowchart of an IPU update process used in synchronization of corresponding SCP databases.

FIG. 19 illustrates a flow chart describing operation of the IPUupd process. In block 442, the sync buffer is received from the IPUsync process of the mate SCP. In blocks 444, 446, 448 and 450 each record of the sync buffer is used to update the associated file.

As in the case of FIG. 18, in the alternative embodiment of separate IPUupd processes for the transient and voice mail information of each file, the basic flow of FIG. 19 could be used with the exception that each process would receive either the transient sync buffer (in the case of IPUupdT) or voice mail sync buffer (in the case of IPUupdV) in block 442.

FIG. 20 illustrates a diagram of the Centralized Global Title Translation (CGTT) table 34. The CGTT table 34 relates ranges of PSNs to the SCP pair 26 responsible for supporting subscribers within the range. The information in the CGTT table 34 is used to support subsystems within the AIN system 22 which need such information namely the SCPs 26, the STPs 24, SMS 30 and VMS 32. The SMS needs the information in order to determine which SCP pair 26 (or multiple SCP pairs 26) to send information on adding, deleting and modifying subscriber account information. The STPs 24 need the information in the CGTT table 34 to route queries to the proper SCP pair 26. The VMS 32 needs the information in the CGTT table 34 in order to send voice mail status information to the proper SCP pair 26. Finally, the SCPs 26 need the information in the CGTT table 34 in order to determine the SCP associated with the other party to a telephone connection.

Referring to FIG. 20, the CGTT table 34 has n entries (or records) 36, where n could be 1000 entries in a typical implementation (or could be unlimited). For each entry, there are five fields. The first field 38 identifies the number of digits for the PSN in the ranged defined by the entry. This field is used where the telephone system does not used fixed length numbers, such as in Japan and other countries. The second field identifies the starting PSN in the range and the third field identifies the last PSN in the range. The fourth field identifies a first SCP pair associated with the PSNs within the range defined by the second and third fields. The fifth field identifies a second SCP pair 26 associated with the PSNs within the range defined by the second and third fields. The second SCP pair 26 is used when information is being written to two SCP pairs during migration of data between SCP pairs, as described in greater detail below.

Within the fourth and fifth fields, there are nine sub-fields. The first sub-field defines the translation type. If necessary, this can be used to identify different network types. The second sub-field identifies a number plan for numbering plan, which may vary between providers. The third sub-field defines a backup mode, either to the first SCP, load sharing between the first and second SCPs, or to the second SCP if the first SCP is inoperable. The fourth, fifth and sixth sub-fields identify whether or not the STP is the final STP, the name of the primary SCP and the destination application in the primary SCP. The seventh, eighth and ninth sub-fields identify the same information for the backup path.

In operation, the CGTT table 34 can be used to change the allocation of PSNs between the various SCP pairs. A reallocation can be effected either upon adding a new SCP pair, or to reallocate PSNs from an overburdened SCP pair to an underutilized SCP pair.

Distribution of new GTTs to various subsystems within the AIN can be performed using one of two methods. First, a new table for the subsystem can be prepared in the NCC and sent to the subsystem. When the new GTT is received by the subsystem, the old GTT can be replaced by the new GTT.

In some situations, however, a simple file replacement may not be possible without interruption of service. In this case, existing editing programs for editing a GTT can be used in connection with the data in the CGTT table 34. First, a copy of the GTT in the subsystem is received by the NCC. This copy is compared with the current information in the CGTT table 34. The differences between the GTT and the CGTT are determined. These differences are used to generate commands to control the editing program for the GTT. Instead of sending the new table to the subsystem, the commands are sent to be run as a batch file, mimicking the commands which would be input by a user to make the changes. In the preferred embodiment, however, the commands are automatically generated by the NCC by a comparison of the two databases, and the commands are downloaded to the subsystem and executed with little or no human interaction.

FIGS. 21 and 22 are flow charts illustrating the two methods for effecting a change in a subsystem's internal GTT. In FIG. 21, a flow chart describing the database replacement method is shown. In block 460, a GTT database for the subsystem is generated using information from the CGTT 34. In block 462 the new GTT for the subsystem is downloaded from the NCC to the subsystem. In block 464, the GTT currently being used by the subsystem is replaced with the new GTT.

FIG. 22 illustrates the batch file method for modifying a current GTT in a subsystem in accordance with information in the CGTT 34. In block 470, the NCC uploads the GTT currently being used in the subsystem. The information from the current GTT is compared to information in the CGTT 34 in block 472 to determine changes, if any, which need to be made to the subsystem's current GTT to conform the information to the CGTT 34. In block 474, commands to modify the current GTT are generated. Typical commands would be ADD <record>, DELETE <record>, or MODIFY <record>. A batch file with these commands is downloaded to the computer which executes the GTT edit program for the specified subsystem in block 476. The batch file is executed by the computer to effect the modifications to the GTT in block 478.

FIGS. 23a–e illustrate migration of information from one SCP pair (SCP1, the originating SCP, comprising SCPs 1A and 1B) to a second SCP pair (SCP2, the terminating SCP, comprising SCPs 2A and 2B). Migration of information from one SCP pair 26 to another SCP pair 26 involves transferring records corresponding to a range of PSNs from SCP1 to SCP2. This procedure may be performed, for example, when a new SCP pair 26 is added to the system or when records are shifted in order to equalize the loads between SCP pairs 26. Importantly, the migration of information can occur dynamically, with no down time associated with the migration.

Figure 23A:
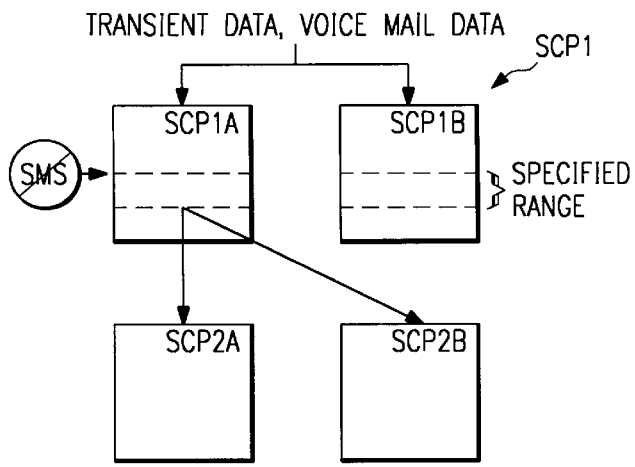
FIGS. 23*a* through 23*e* illustrate the process of migrating information between SCPs.

The first migration step is shown in connection with FIG. 23a. First, the operator disables SMS services (adding, deleting and modifying customer records) for the specified range of numbers to be switched from SCP1 to SCP2. Since SMS services do not affect connections between telephone devices, this step will not affect phone service. All subscriber records within the specified range are copied from SCP 1A to SCP2A and to SCP 2B. The originating SCPs 1A and 1B will reset transfer sync bits (indicating that a record being transferred has been modified) associated with each of the records in the specified range. SCPs 2A and 2B will reset the transfer sync bits and the query sync bits (described in connection with synchronizing between mate SCPs, in connection with FIGS. 17–19, above) in the received records. While the transfer of record information is being performed, the originating SCP1 receives queries (transient data) and voice mail information, and will set the transfer sync bits and query sync bits of the affected records. The query sync bits are reset upon the SCPs sending the transient and voice mail updates to their mates (i.e., SCP 1A to SCP 1B and SCP 1B to SCP 1A).

After the transfer of records is completed, an audit is performed between SCPs 1A and 2A and between SCPs 1B and 2B. If there are discrepancies, the problems are fixed or the process can be restarted.

Figure 23B:
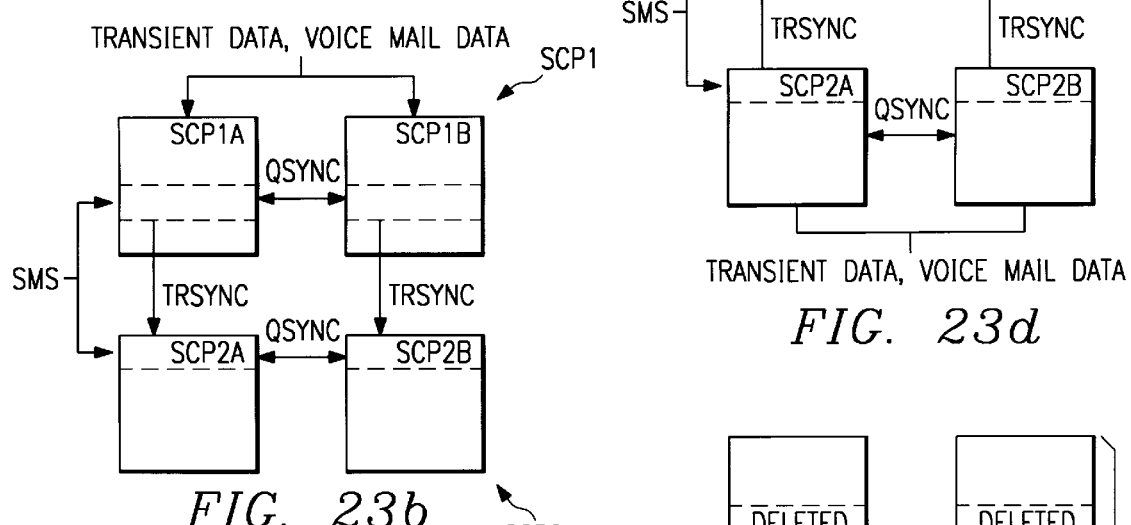

FIG. 23b illustrates the next step in the migration of the records. In this step, the transfer sync command is issued. Once the transfer sync command is issued, SCP 1A will send updates to SCP 2A and SCP 1B will send updates to SCP 2B. Upon sending the update information, the originating SCP 1A or 1B will reset its transfer sync bits for the updated records. SCP2 is enabled to send updates to SCP1, but since it is not receiving transient or voice mail queries, SCP2 will not be passing messages to SCP1 at this point. Synchronization between mate SCPs 1A and 1B continues to be performed. Synchronization between SCPs 2A and 2B is also enabled.

After the transfer sync command is set, the global GTT in the SMS and the SCPs (in accordance with the CGTT 34) is updated in order to send updates for records in the specified range to both SCP1 and SCP2. Thus, any change from the SMS affects both SCP pairs.

Figure 23D:
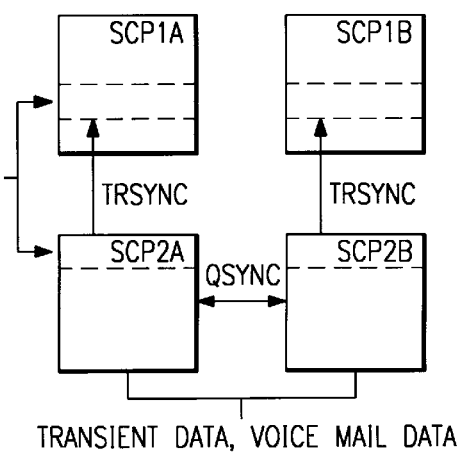
Figure 23C:
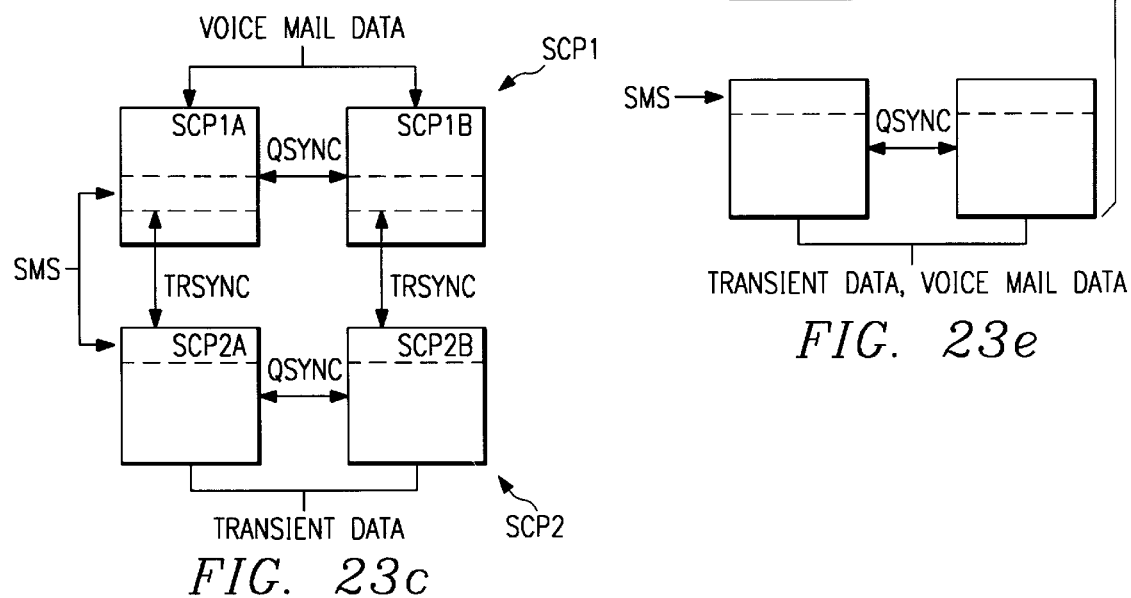

In FIG. 23c, the STPs' GTT are modified to route all queries for records in the specified range to the termination SCP pair, SCP2. Transfer sync now works in both directions, since SCP2 will update SCP1 regarding transient data and SCP1 will update SCP2 regarding voice mail data.

In FIG. 23d, the VMS's GTT is modified to route all voice mail queries for records in the specified range to the terminating SCP pair, SCP2. While the transfer sync is still working in both directions, in effect, the originating SCP pair, SCP1, is no longer receiving any transient or voice mail queries and thus has no update messages to sent. When SCP2 sends updates to SCP1, it resets the transfer sync bits of the updated records. It should be noted that VMS's GTT could be modified at the same time as the STP's GTT in order to switch both the voice mail and transient queries to SCP2 at the same time.

At this point, both SCP pairs are fully operational for the specified range of records, although the terminating pair is performing the ongoing services. The processing of the records by SCP2 can be monitored and the transfer synchronization can be disabled if the processing is proceeding properly. If not, the operator can revert back to the originating SCP pair by changing the GTTs associated with the STPs and the VMS to their previous assignments.

Figure 23E:
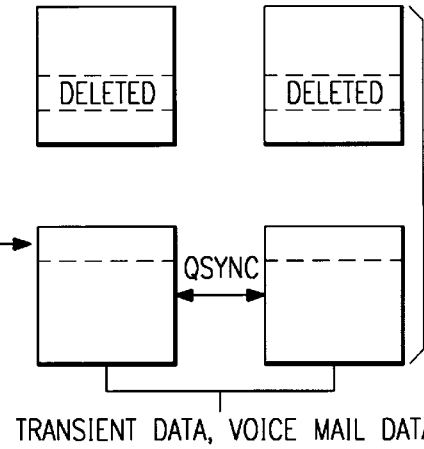

In FIG. 23e, assuming there is no reversion to the previous assignment, the GTTs for the SMS and SCPs (in accordance with the CGTT 34) can be changed to specify the terminating SCP pair as being responsible for the records within the specified range. The transferred records can then be deleted from SCP1.

The AIN system described herein provides significant advantages over the prior art. Importantly, multiple SCPs provide high speed responses to queries. As the subscriber database increases, additional SCPs can be added to the system. Records from one SCP pair can be migrated to another pair, without an cessation of services or loss of transient or voice mail information. A centralized GTT provides an efficient system for modifying the GTTs associated with various subsystems in the AIN. The combination of the GTTs directing queries to the correct SCP and the route table directing queries from the host 51 to the correct IPU provides a highly efficient signal path which quickly passes queries to the intended destination. A high speed synchronization method maintains redundancy between SCPs in a SCP pair with a minimal latency between updates.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A communications system, comprising:
   a plurality of telephonic devices coupled to a switching network; and
   a service network for providing information responsive to requests for subscriber information from said switching network, comprising:
      database circuitry for maintaining a database of subscriber information for a predetermined set of subscriber numbers, said database circuitry comprising a plurality of service control points, each service control point responsible for maintaining a portion of the database;
      a centralized title translation table for defining one or more service control points associated with each subscriber number in said predetermined set of subscriber numbers; and
      circuitry for generating tables defining one or more service control points associated with each subscriber number in said predetermined set of subscriber numbers for use in various subsystems of said service network responsive to information in the centralized title translation table for directing requests to the proper service control point.

2. The communications system of claim 1 wherein said circuitry for generating tables includes circuitry for downloading a database to one or more of said subsystems.

3. The communications system of claim 2 wherein said circuitry for generating tables includes circuitry for replacing a current table in each of said one or more subsystems with the table downloaded to each of said one or more subsystems.

4. The communications system of claim 1 wherein said circuitry for generating tables includes circuitry for downloading commands for instructing one of said subsystems to modify a current table in said one subsystem to conform the information in said one subsystem to the information is said centralized title translation table.

5. The communications system of claim 1 wherein said circuitry for generating tables includes circuitry for uploading a current table from one of said subsystems, comparing said current table with said centralized title translation table and generating commands responsive to the difference between the tables.

6. The communications system of claim 1 wherein said centralized title translation table associates one or more ranges of subscriber numbers with each service control point.

7. The communications system of claim 6 wherein the centralized title translation table associates a primary service control point for each of said ranges of subscriber numbers.

8. The communications system of claim 7 wherein the centralized title translation table optionally associates a secondary service control point for each of said ranges of subscriber numbers.

9. The communications system of claim 1 wherein said service network includes a voice mail system which receives database updates responsive to information in said centralized title translation table.

10. The communications system of claim 1 wherein said service network includes a service management system which receives database updates responsive to information in said centralized title translation table.

11. The communications system of claim 1 wherein said service network includes one or more switches for passing requests from said switching network to said service control points, which receive database updates responsive to information in said centralized title translation table.

12. The communications system of claim 1 wherein said service control points receive database updates responsive to information in said centralized title translation table.

13. A method of providing path information to database circuitry comprising a plurality of service control points, each service control point being responsible for maintaining a portion of a subscriber database associated with a predetermined set of subscriber numbers, comprising the steps of:

defining a relationship between each subscriber and one or more service control points in a centralized title translation table; and generating tables defining one or more service control points associated with each subscriber number in said predetermined set of subscriber numbers for use in various subsystems in a service network responsive to information in the centralized title translation table.

14. The method of claim 13 wherein said generating step includes the step of downloading a database to one or more of said subsystems.

15. The method of claim 14 wherein said generating step further includes the step of replacing a current table in a subsystem with a downloaded database.

16. The method of claim 13 wherein said generating step includes the step of downloading commands to one of said subsystems instructing said one subsystem to modify a current table in said one subsystem to conform the information in said current table to the information in said centralized title translation table.

17. The method of claim 13 wherein said generating step includes the steps of uploading a current table from one of said subsystems, comparing the information in said current table to information in said centralized title translation table and generating commands responsive to the difference between the tables.

18. The method of claim 13 wherein said defining step comprises the step of associating one or more ranges of subscriber numbers in said centralized title translation table with each service control point.

19. The method of claim 13 wherein said associating step includes the step of associating a primary service control point with each of said ranges of subscriber numbers.

20. The method of claim 19 wherein step of associating one or more ranges of subscriber numbers in said centralized title translation table with each service control point further includes the step of optionally associating a secondary service control point with each of said ranges of subscriber numbers.

21. The method of claim 13 wherein said generating step includes the step of generating tables for use in a voice mail system responsive to information in the centralized title translation table.

22. The method of claim 13 wherein said generating step includes the step of generating tables for use in a service management system responsive to information in the centralized title translation table.

23. A communications system, comprising:

a plurality of telephonic devices coupled to a switching network; and a service network for providing information responsive to requests for subscriber information from said switching network, comprising:

database circuitry for maintaining a database of subscriber information, said database circuitry comprising a plurality of service control points, each service control point responsible for maintaining a portion of the database;

a centralized title translation table for defining ranges of subscriber numbers and the service control points associated with said ranges of subscriber numbers; and circuitry for generating tables associating ranges of subscriber numbers with corresponding service control points for use in various subsystems of said service network responsive to information in the centralized title translation table.

24. A method of providing path information to database circuitry comprising a plurality of service control points, each service control point being responsible for maintaining a portion of a subscriber database, comprising the steps of:

defining a relationship between ranges of subscriber numbers and the service control points associated with the ranges of subscriber numbers in a centralized title translation table; and generating tables associating ranges of subscriber numbers with corresponding service control points for use in various subsystems in a service network responsive to information in the centralized title translation table.

* * * * *